United States Patent [19]
Jalali et al.

[11] Patent Number: 6,154,659
[45] Date of Patent: Nov. 28, 2000

[54] FAST FORWARD LINK POWER CONTROL IN A CODE DIVISION MULTIPLE ACCESS SYSTEM

[75] Inventors: Ahmad Jalali, Plano, Tex.; Leo Strawczynski, Ottawa, Canada

[73] Assignee: Nortel Networks Limited, Montreal, Canada

[21] Appl. No.: 08/998,340

[22] Filed: Dec. 24, 1997

[51] Int. Cl.[7] .................................................. H04Q 7/00
[52] U.S. Cl. ............................................ 455/522; 455/69
[58] Field of Search ..................... 455/422, 509, 455/522, 69, 70, 226.1; 370/318, 332, 333; 375/227, 296, 297, 259, 267, 347, 200, 206, 208

[56] References Cited

U.S. PATENT DOCUMENTS

| | | | |
|---|---|---|---|
| 5,257,283 | 10/1993 | Gilhousen et al. | 455/69 |
| 5,267,262 | 11/1993 | Wheatley, III | 455/69 |
| 5,297,161 | 3/1994 | Ling | 455/69 |

*Primary Examiner*—Thanh Cong Le
*Attorney, Agent, or Firm*—John D. Crane

[57] ABSTRACT

The radiotelephone demodulates the information received from the base station. The symbol-energy-to-noise-density ($E_s/N_o$) is estimated over a specified duration. This estimate is compared to a target $E_s/N_o$ value. The target is updated periodically in order to maintain the quality of service. If the measured $E_s/N_o$ is greater than the target, the radiotelephone sends a power down command over a reverse power control signaling channel to the base station. If the measured $E_s/N_o$ is less than the target, the radiotelephone sends a power up command to the base station over the same channel. A multi-carrier transceiver system for a code division multiple access system includes circuitry for up-converting processed user data to a plurality of frequency channels. The transceiver, in some embodiments, further includes a plurality of antennas for transmitting each channel of user data. A method of using the multi-carrier system includes processing user data, and then transmitting the data at different frequency channels, and when necessary, transmitting the data through different antennas separated in space and/or having orthogonal polarization.

20 Claims, 11 Drawing Sheets

FAST FORWARD LINK POWER CONTROL IN A CODE DIVISION MULTIPLE ACCESS SYSTEM

BACKGROUND OF THE INVENTION

I. Field of the Invention

The present invention relates to radio communications. More particularly, the present invention relates to power control in a code division multiple access radiotelephone system.

II. Description of the Related Art

Multiple access techniques are some of the most efficient techniques for utilizing the limited radio frequency spectrum. Examples of such techniques include time division multiple access (TDMA), frequency division multiple access (FDMA), and code division multiple access (CDMA).

CDMA employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each baseband data signal to be transmitted with a unique wide band spreading code. Using this technique, a signal having a bandwidth of only a few kilohertz can be spread over a bandwidth of more than a megahertz. Typical examples of spread spectrum techniques are found in M. K. Simon, *Spread Spectrum Communications*, Volume I, pp. 262–358.

In a direct sequence CDMA-type radiotelephone system, multiple signals are transmitted simultaneously at the same frequency. A particular receiver then determines which signal is intended for that receiver by a unique spreading code in each signal. The signals at that frequency, without the particular spreading code intended for that particular receiver, appear to be noise to that receiver and are ignored. Hereinafter, references to CDMA systems imply direct sequence CDMA systems.

Since multiple radiotelephones and base stations transmit on the same frequency, power control is an important component of the CDMA technique. A higher power output by a radiotelephone and/or base station increases the interference experienced by the other radiotelephones and base stations in the system. In order to keep the radiotelephones and base stations from transmitting at too much power, thereby lowering system capacity, some form of power control must be implemented.

The radiotelephone can aid the base station in the control of the power on the forward link (from the base station to the radiotelephone) by transmitting a power control message to the base station on the reverse link (from the radiotelephone to the base station). The radiotelephone gathers statistics of its error performance and informs the base station via a power control message. The base station may then adjust its power level to the specific user accordingly.

The IS-95 CDMA system requires a high $E_s/N_o$ on the forward traffic channel (from the base station to the mobile radiotelephone) during low speed operation due to a slow power control process. This is due to the effects of Rayleigh fading being more pronounced at low speeds than high speeds since the radiotelephone is in the fade longer at the lower speeds. Additionally, at higher speeds, the interleaving spreads out the effects of the fading, thus lowering the required $E_s/N_o$. $N_o$ includes all sources of interference including thermal noise and CDMA multi-user interference.

The ratio $E_b/N_o$ is a standard quality measurement for digital communications system performance. The ratio expresses the bit-energy-to-noise-density of the received signal. $E_b/N_o$ can be considered a metric that characterizes the performance of one communication system over another; the smaller the required $E_b/N_o$ the more efficient is the system modulation and detection process for a given probability of error. A more detailed discussion of this concept can be seen in B. Sklar, *Digital Communications, Fundamentals and Applications*, Chapter 3 (1988).

A related metric is the $E_s/N_o$, which is the ratio of symbol-energy-to-noise-density of the received signal. The $E_s/N_o$ is related to the $E_b/N_o$ by:

$$E_s/N_o = (E_b/N_o)N$$

where N is the number of bits per symbol. In binary phase shift keying (BPSK) modulated communication systems, N=1 and, consequently, $E_s/N_o = E_b/N_o$. In quadrature phase shift keying (QPSK) modulated communication systems, N=2 so that $E_s/N_o = 2(E_b/N_o)$. Because symbols are actually transmitted, it is often more convenient to measure $E_s/N_o$ directly and then convert to $E_b/N_o$ if desired.

When a deep fade is experienced, the system attempts to increase the transmit power in order to overcome the fade. However, when the radiotelephone moves out of the fading conditions, the transmit power must be decreased quickly or system capacity will suffer.

The IS-95 power control process may not be able to lower the transmit power fast enough. Fast forward link power control decreases the transmit power rapidly but relies on finding an accurate estimate of $E_s/N_o$ or related metric. Additionally, there must be a way to switch between using the IS-95 power control and fast forward power control since they behave differently under different conditions. There is an unforeseen need for a process to find a reliable estimate of the bit-energy-to-noise-density or symbol-energy-to-noise-density of the channel and also be able to determine when to use the IS-95 power control and fast forward power control.

Current CDMA systems are being developed in view of the TIA/EIA/IS95 Industry Standard (IS95). IS95 defines a 1.25 MHz bandwidth channel (carrier) which supports data rates of 9.6 and 14.4 kilobits per second (kbps). Current systems which are limited to the 1.25 MHz bandwidth work adequately for voice communications. In the future, however, there will be increasing demand to transmit information including graphics data. Accordingly, data throughput requirements will exceed the capabilities of the current systems. Nonetheless, next generation CDMA systems are required to support high throughput data transmissions. In order to provide data rates as high as will be required, however, bandwidth requirements will exceed 1.25 MHz. As these higher bandwidth systems are deployed, existing system designs will need to adapt to correctly transmit the data at such high throughput levels. There will be a requirement to develop systems which not only support high data throughputs, but also support accurate data reconstruction as a result of common transmission problems including fading and attenuation.

SUMMARY OF THE INVENTION

The present invention encompasses a process for controlling the transmit power of a base station by a radiotelephone in a wideband CDMA system. The base station transmits data frames to the radiotelephone over a forward channel. The radiotelephone transmits data frames to the base station over a reverse channel.

Generally in a single carrier environment, the radiotelephone demodulates data frames received from the base station to calculate the symbol-energy-to-noise-density of the frames. The calculated symbol-energy-to-noise-density is compared against a target symbol-energy-to-noise-density value to determine whether base station power should be increased or decreased or left unchanged.

If the estimated symbol-energy-to-noise-density is less than the target value, a power control command is transmitted over a reverse power control signaling channel to the base station instructing the base station to increase its transmit power a predetermined amount. If the estimated symbol-energy-to-noise-density is greater than the target value, the power control command instructs the base station to decrease transmit power.

Multiple base stations may receive the power control command when the radiotelephone is in a soft hand-off state. Each base station involved in the call adjusts its transmit power accordingly based upon the power control command.

The target symbol-energy-to-noise-density is adjusted after every frame period. The target is adjusted in response to the quality of the received frame. If the frame is good, the target is decreased by a pre-configured amount. If the frame is bad, the target value is increased by a pre-configured amount.

In a multi-carrier CDMA system, a plurality of carriers, each having a 1.25 MHz bandwidth at a different center frequency, are used to create a total bandwidth which is an integer multiple of the current IS95 carrier bandwidth and which is capable of increasing data throughput rates to meet projected needs. The multi-carrier systems not only provide increased data throughput rates in a manner which is compatible with current systems which operate solely over a single 1.25 MHz carrier, but also provide improved performance. User data which has been encoded and interleaved, is de-multiplexed into a plurality of channels, wherein each channel is encoded using a Walsh and a Pseudo-Noise (PN) code, and then is up-converted and transmitted on separate 1.25 MHz carriers. In some embodiments, the plurality of carriers are transmitted through one antenna. In other embodiments, the plurality of carriers are transmitted through a plurality of antennas which are separated in space and/or have orthogonal polarization. This reduces correlation of fading on different carrier frequencies.

As with a single carrier system, power control is an important aspect of multi-carrier CDMA systems. Generally, power control in the multi-carrier environment is performed to reduce interference within the communication network in a number of different ways. In a first embodiment of the invention, a metric, e.g. $E_s/N_o$ or $E_b/N_o$, is calculated by a logic device within the radiotelephone for each of the received carriers. The calculated metrics are then averaged. The logic device then compares the averaged metric to a specified target value for determining whether transmission power for the carriers should be changed. The result of this determination is transmitted by the radiotelephone to the base station in a specified signal. In a second embodiment of the invention, the calculated metric for each carrier is compared to a specified target value to determine the proper transmission power change on a per carrier basis. In this embodiment, one specified target value is used for all carriers. In a third embodiment, a target value is calculated for each carrier and then compared to the corresponding calculated metric. For each of the above embodiments of the invention, the radiotelephone transmits one specified signal, such as a power control command bit stream, to the base station for the carriers being transmitted therefrom.

The second and third embodiments allow a communication system to reduce unnecessary power levels used by a base station on a per carrier basis thereby improving overall system efficiencies and reducing interference/noise in the CDMA network. For example, if one of a plurality of carriers is subject to fading, the radiotelephone may prompt the base station to dramatically reduce the transmission power level for the faded carrier so long as the information across the carriers may be used to accurately reconstruct the transmitted information.

DETAILED DESCRIPTION OF THE PREFERRED EMBODIMENT

The processes of the present invention enable a radiotelephone in a radiotelephone communication system to assist in rapidly adjusting a base station's transmit power for a plurality of carriers by quickly estimating an accurate $E_s/N_o$ or other metric. Additionally, the present invention includes determining when the standard IS-95 power control process should be used for better performance and when the fast forward power control process of the present invention is needed for better performance for the plurality of carriers.

The following discussion with respect to power control refers to mobile radiotelephones and base stations communicating over a single carrier for the sake of simplicity. References to mobile radiotelephones include radios used in a terrestrially based communication system as well as a satellite based communication system. Similarly, the base stations can be located on the earth or as orbiting satellites.

Additionally, the present invention estimates and uses the received $E_s/N_o$ and compares this to a target $E_s/N_o$. Additional embodiments use other signal quality metrics.

The IS-95 CDMA system requires a high $E_s/N_o$ on the forward traffic channel (from the base station to the mobile radiotelephone) during low speed operation due to a slow power control process. This is due to the effects of Rayleigh fading being more pronounced at low speeds than high speeds since the radiotelephone is in the fade longer at the lower speeds. Additionally, at higher speeds, the interleaving spreads out the effects of the fading, thus lowering the required $E_s/N_o$.

The IS-95 implementation of the forward link power control enables each base station to adjust its forward traffic channel power at a rate of once per frame during Rate Set 2 operation. The transmit power change is slower during Rate Set 1 operation.

Rate Set 1 and 2 forward link power control operation are defined in the IS-95A standard. Rate Set 1 uses transmitted rates of 9600 bits per second (bps), 4800 bps, 2400 bps, and 1200 bps. Rate Set 2 uses transmitted rates of 14,400 bps, 7200 bps, 3600 bps, and 1800 bps.

Rate Set 1 forward link power control operation is slower due to its two modes of operation. In one mode, the radiotelephone must first count a configured number of received frame erasures and then send a power control message to the base station. This is referred to in the art as threshold reporting. In the second mode, the radiotelephone waits for a configured number of frames before sending a power control message to the base station. This is referred to in the art as periodic reporting.

Fast forward link power control requires that the forward link transmit powers should be adjusted as rapidly as possible. In the preferred embodiment, this adjustment is done every sixteenth of a frame. This sixteenth of a frame is referred to in the art as a power control group.

Figure 1:
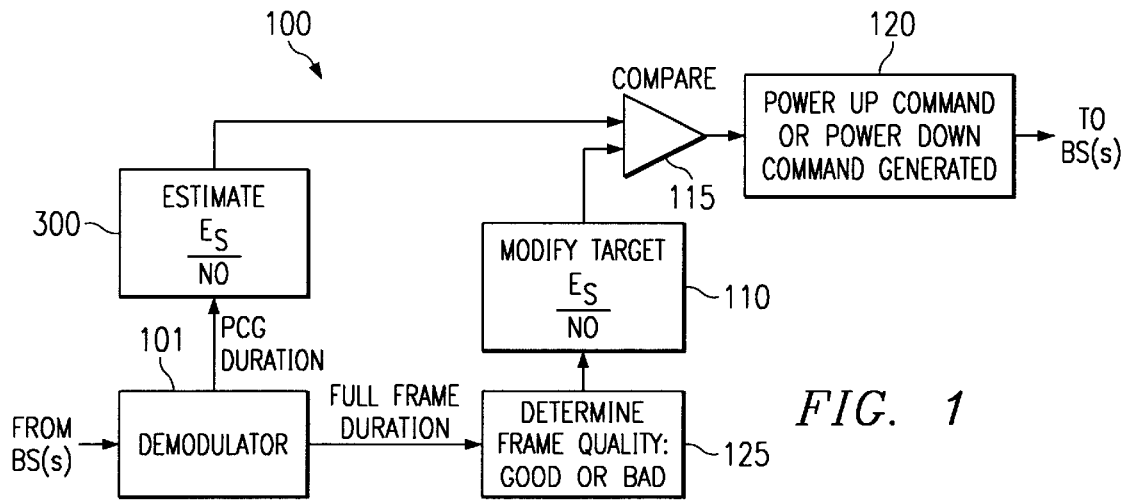
FIG. 1 is a functional block diagram of a fast forward link power control system.

FIG. 1 is a functional block diagram of the fast forward link power control system. Referring now to FIG. 1, the power control system 100 is for determining whether to transmit a power up or power down command to the base station.

The radiotelephone receives information from the base station. This information is in the form of a stream of data frames. The type and format of this data is well known in the art.

The radiotelephone demodulates (step 101) the information. The $E_s/N_o$ is estimated (step 300), for a power control group duration, using the estimation process of the present invention illustrated in FIG. 3. This process is discussed subsequently.

The estimated $E_s/N_o$ is compared (step 110) to a target $E_s/N_o$. The target $E_s/N_o$ is adjusted on a frame by frame basis. The target is modified (step 110) in such a way as to maintain the required frame error rate. In the preferred embodiment, this frame error rate target is set by the network operators.

In order to modify the target $E_s/N_o$, the quality of each received frame is determined (step 125). If a particular received frame was good, the target is decreased a predetermined amount. If the particular received frame was bad, the target is increased a predetermined amount. The predetermined amount being set by the network operators. Determining the quality of the frames is well known in the art and is discussed in John G. Proakis, *Digital Communications*, Chapter 7.

If the estimated $E_s/N_o$ is less than the target $E_s/N_o$, the radiotelephone instructs (step 120) the base station to power up by a predetermined amount. If the measured $E_s/N_o$ is greater than the target $E_s/N_o$, the radiotelephone instructs (step 120) the base station to power down by a predetermined amount. In the preferred embodiment, the predetermined amount is 1 dB. Alternate embodiments use other values set by the network operators, such as 0.5 dB.

The power change commands, in the preferred embodiment, are transmitted using a reverse power control signaling channel. The reverse power control signaling channel can also be used for special messages such as periodically transmitting information on the active and candidate set pilots with which the radiotelephone is dealing. This gives the network continuous information on hand-off status.

The preferred embodiment employs a reverse link pilot channel that the base station uses to perform coherent demodulation of the reverse power control signaling channel. The reverse link pilot channel is transmitted by the radiotelephone and can be used to coherently demodulate the traffic channel.

The reverse link pilot channel is a unique channel for each radiotelephone. In the preferred embodiment, the channel uses the radiotelephone's long code as part of the spreading/modulation.

Alternate embodiments use other forms for transmitting the power control commands. One embodiment punctures the data stream to the base station. A single power control bit is punctured into the data stream at predetermined locations in order for the base station to know the location. A logical one instructs the base station to increase power while a logical zero instructs the base station to decrease power by the predetermined amount.

Alternate embodiments use other power control instructions. One embodiment uses logical zero for power increase and logical one for power decrease. Other embodiments use more than one bit for power control. For example, if two bits are used, a total of four different step sizes are possible (e.g., up by 1 dB, up by 0.5 dB, down by 1 dB, down by 0.5 dB, etc.).

By puncturing the data stream in known locations, the base station knows where to look for the power control command. Alternate embodiments puncture the data stream in other locations. As long as the data stream is not punctured contiguously, the loss of data is so minimal that the puncturing does not affect the communication quality.

For proper operation of the above power control process of the present invention, the $E_s/N_o$ received by the radiotelephone must be determined. In order to understand the process of estimating the $E_s/N_o$, background theory of CDMA is first discussed.

As is well known in the art, information transmitted from the base station to the radiotelephone is modulated using quadrature phase shift keying (QPSK). A transmitted signal experiences Rayleigh fading plus an additive white gaussian noise component to both the I and Q components of the signal. The transmitted signals thus have the mathematical form:

I channel: $A_S(t) \cdot re\{e^{j\omega_c t}\}$

Q channel: $A_S(t) \cdot re\{e^{j\omega_c t}\}$ where $A_S(t)$ is the transmitted amplitude and $\omega_c$ is the CDMA carrier frequency.

On reception, a multipath component of the signal has the form:

I channel: $A_R(t) \cdot re\{\alpha e^{j\phi}e^{j\omega_c t}\} + n_i(t)$

Q channel: $A_R(t) \cdot re\{\alpha e^{j\phi}e^{j(\omega_c t + \frac{\pi}{2})}\} + n_q(t)$;

where $A_R(t)$ is the received amplitude due to the path loss (lost signal energy due to distance, shadowing, etc.), $\alpha e^{j\phi}$ represents the amplitude attenuation and phase shift due to the channel fading, and $n_i(t)$ and $n_q(t)$ are the additive white gaussian noise terms. The white gaussian noise terms represent both thermal noise and CDMA interference.

Based on the received energy, the fading coefficients are estimated for each multi-path via the pilot channel. This is used in maximal ratio combining that is well known in the art.

Maximal ratio combining, performed by the Rake receiver, is a technique by which different fading paths (multi-paths) are combined in the receiver. Each path is weighted by an estimate of its received amplitude before being combined with the other paths.

The fading coefficients, $\alpha$ and $\phi$, are estimated by dividing the output of the pilot channel correlator by the energy of the pilot channel. This is illustrated in the following equations. The pilot channel correlator output is expressed as:

$$Y_{pilot} = 2\alpha_L \epsilon_{pilot} e^{j\phi L} + N_P$$

where $\epsilon_{pilot}$ is the known symbol energy transmitted on the pilot channel and $N_P$ is the noise on the pilot channel.

The estimates of $\alpha$ and $\phi$ are then found by:

$$\frac{Y_{pilot}}{2\epsilon_{pilot}} = \alpha_L e^{j\phi L} + \frac{N_P}{2\epsilon_{pilot}}.$$

The receiver/demodulator outputs soft values for both the I and the Q channels. As is well known in the art, the soft values are normally used by the Viterbi decoder to determine what information was transmitted. In the present invention, however, the soft values are used by the $E_s/N_o$ estimation process.

Figure 2:
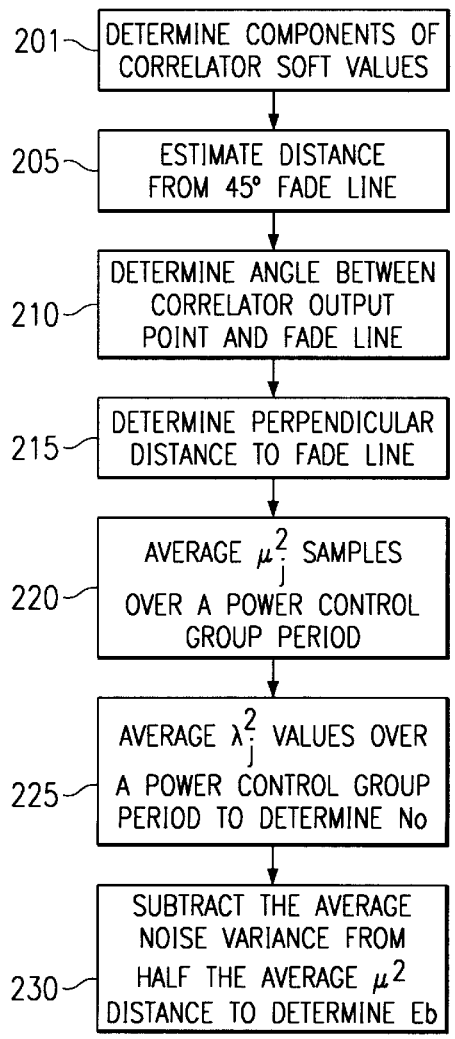
FIG. 2 is a flowchart which illustrates a signal symbol-energy-to-noise-density estimation process.

FIG. 2 is a flowchart which illustrates a signal symbol-energy-to-noise-density estimation process. Referring now to FIG. 2, the $E_s/N_o$ estimation process of the present invention, is used by the power control process discussed above in controlling transmit power over the forward link. The $E_s/N_o$ estimation process, however, is not limited to power control. The estimation process can be used anytime a noise estimate is required in a QPSK system.

Referring again to FIG. 2, the soft values are first broken up into their components (step 201), each QPSK symbol producing two soft values:

I channel: $\beta\sqrt{\frac{E_s}{2}} d_i + n_i = x$

Q channel: $\beta\sqrt{\frac{E_s}{2}} d_q + n_q = y$ where $d_i$ and $d_q$ are the polarities of the I-channel and Q-channel bits and are either +1 or −1, and the n terms are due to the additive white gaussian noise in the channel. $\beta$ includes the effect of fading and transmit power per symbol.

The soft values are continuously updated and output by the correlator. Therefore, a series of values is generated by the correlator. In the present invention, $(x_1, y_1)$ is the first output, $(x_2, y_2)$ is the second output, and $(x_j, y_j)$ is the $j^{th}$ output.

In order to estimate the $E_s/N_o$, the noise density, $N_O$, must be estimated. Since the I and Q channels fade together, the point $(x_j, y_j)$ falls somewhere on a 45° or 135° line depending on which QPSK data symbol was transmitted. However, due to noise, $(x_j, y_j)$ is displaced from this line. Finding the distance from $(x_j, y_j)$ to the line, therefore, gives an estimate of $N_O$.

Figure 3:
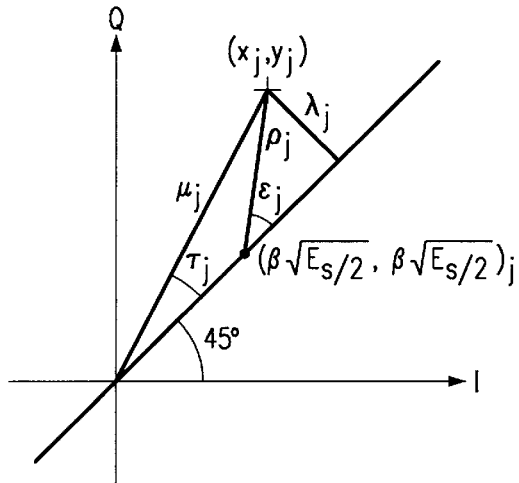
FIG. 3 is a graph which illustrates I and Q axes in relation to a corrector output point above the 45° fade line.

FIG. 3 illustrates an example where the $j^{th}$ point lies in the upper right quadrant. Alternate embodiments, however, accommodate the point $(x_j, y_j)$ in any of the four quadrants. Illustrated in FIG. 3 is the 45° line and point $(x_j, y_j)$.

The distance is denoted $\mu_j$ in FIG. 3 and is computed (step 205) by:

$$\mu_j = \sqrt{x_j^2 + y_j^2}; \text{ therefore } \mu_j^2 = x_j^2 + y_j^2.$$

The angle denoted $\tau_j$ in FIG. 3 is the angle between the point $(x_j, y_j)$ and the 45° line. This angle is computed (step 210) by:

$$\tau_j = |\tan^{-1}|(y_j/x_j)|-45°|.$$

The perpendicular distance to the 45° line is illustrated in FIG. 3 as $\lambda_j$. This distance is found (step 215) by the equation:

$$\lambda_j = \mu_j \text{sink}(\tau_j).$$

It should be noted that this equation accommodates the soft values $x_k$ and $y_k$ lying in any of the four possible quadrants. The inner and outer absolute value operators in effect transform any combination of $x_k$ and $y_k$ to the upper right quadrant.

The samples of $\mu_j^2$ are averaged (step 220) over a number of correlator outputs (one power control group period). The averaging of $\mu^2$ during the power control group period takes the form:

$$\overline{\mu^2} = \frac{1}{n}\sum_{j=1}^{n} \mu_j^2$$

where n is the number of samples taken in the power control group.

The averaging process is accomplished by first substituting x and y from above into the equation for $\mu_j$ to yield:

$$\mu_j^2 = \left(\beta_j\sqrt{\frac{E_s}{2}}\,d_{i,j} + n_{i,j}\right)^2 + \left(\beta_j\sqrt{\frac{E_s}{2}}\,d_{q,j} + n_{q,j}\right)^2$$

$$\mu_j^2 = \beta_j^2\sqrt{\frac{E_s}{2}} + \beta_j^2\sqrt{\frac{E_s}{2}} + n_{i,j}^2 + n_{q,j}^2 +$$

$$2\beta_j\sqrt{\frac{E_s}{2}}\,n_{i,j} + 2\beta_j^2\sqrt{\frac{E_s}{2}}\,n_{q,j},$$

noting that $d_{ij}^2 = d_{qj}^2 = 1$.

The last two terms of the equation fall out when the average is computed since the noise and fading are statistically independent and the average of the noise alone has a zero mean. Averaging over a power control group period yields:

$$\overline{\mu_j^2} = \beta_j^2 E_s + n_{ij}^2 + n_{qj}^2$$

or $$\overline{\mu^2} = \overline{\beta^2}E_s + 2\sigma_n^2,$$

note that $\overline{\beta^2}E_s$ is the average received symbol energy and $2\sigma_n^2$ is the average noise power.

The values of $\lambda_j^2$ are next averaged over a power control group period (step 225). Substituting the variance of the noise power into the equation for $\lambda$ above results in:

$$\lambda_j^2 = \rho_j^2(\sin\varepsilon_j)^2 = \rho_j^2\left(\frac{1}{2} - \frac{\cos 2\varepsilon_j}{2}\right)$$

where $\rho$ and $\epsilon$ are independent and $\epsilon$ is zero-mean. Therefore, taking the average of $\lambda$ results in the noise power estimate:

$$\overline{\lambda^2} = \frac{\overline{\rho^2}}{2} = \sigma_n^2 = \frac{N_O}{2}.$$

The signal energy per symbol is estimated by subtracting the average noise variance from half the average $\lambda^2$ distance (step 230). This value is expressed by:

$$E_s = \overline{\mu^2} - 2\overline{\lambda^2}.$$

Finally, the ratio for $E_s/N_o$ can be formed as:

$$\frac{E_s}{N_O} = \frac{\overline{\mu^2} - 2\overline{\lambda^2}}{2\overline{\lambda^2}}.$$

Figure 4:
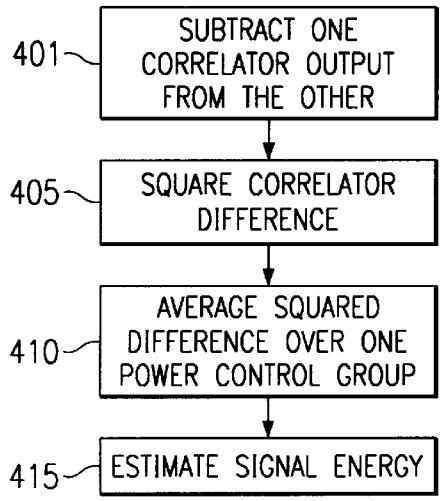
FIG. 4 is a flowchart which illustrates an alternate embodiment of a signal symbol-energy-to-noise-density estimation process.

FIG. 4 is a flowchart which illustrates an alternate embodiment of a signal symbol-energy-to-noise-density estimation process. Referring now to FIG. 4, an alternate estimation is accomplished using the pilot channel on the forward link. The pilot is not modulated (i.e., the same information is transmitted on the pilot I and Q channels), therefore, the signal components in the I-correlator and Q-correlator outputs are identical. This is due to the channel fading and the symbol polarity being the same with only the noise components differing. The I and Q channel correlator outputs are represented by:

$$\text{I channel: } \beta\sqrt{\frac{E_s}{2}} + n_i$$

$$\text{Q channel: } \beta\sqrt{\frac{E_s}{2}} + n_q.$$

The alternate estimation process for $E_s/N_o$ begins by subtracting the Q channel correlator output from the I channel correlator output (step 401), or vice versa. The difference is then squared (step 405) and averaged over a power control group (step 410). This yields two times the noise variance. These steps are represented by:

$$\overline{(I-Q)^2} = \overline{n_i^2 + n_q^2} = 2\sigma_n^2 = N_O.$$

The signal energy is then estimated (step 415) by using the distance $\mu$, from FIG. 2, that was computed above. The signal energy estimation step is expressed as:

$$E_s = \overline{\mu^2} - 2\sigma_n^2.$$

As explained above, once the $E_s/N_o$ is obtained, it is compared to the radiotelephone's target $E_s/N_o$. The difference between the estimated $E_s/N_o$ and the target $E_s/N_o$ triggers the radiotelephone's power control commands.

One possible problem with most fast forward link power control processes is that performance during soft hand-off may suffer if not monitored. Referencing FIG. 5, the mobile radiotelephone (510) was originally communicating with base station 2 (501). The radiotelephone (510) then goes into hand-off with base station 1 (505). During this time, both base stations are transmitting at a high output power (for example, approximately 9% of their total power).

As the radiotelephone (510) moves towards base station 1 (505), the link with base station 2 (501) degrades very quickly. During this time, assuming the link with base station 1 (505) is strong, the radiotelephone (510) sends mainly power down commands.

Due to the distance, shadowing, and/or fading, the reverse link to base station 2 (501) is inadequate and the power control information to base station 2 (501) has a high error rate. The transmit power at base station 2 (501), for example, may increase or remain at some high value such as 11% or 12%. During this time, the link between the radiotelephone (510) and base station 1 (505) continues to improve so that base station 1 (505) continues to power down to possibly 6% or 7%. This scenario is possible at a 50% power control bit error rate to base station 2.

The power down commands the mobile is sending are received correctly at base station 1 but, since the link to base station 2 is degraded, the bits have a high bit error rate to base station 2. This results in base station 2 not adjusting its power down as quickly as base station 1. The capacity suffers since base station 2 is needlessly using higher power from its available pool and also increasing system multiple access noise.

In this example, the capacity of the system is impacted since base station 2 (501) is transmitting at a higher power level than is required. Since 20% of total transmit power is allocated to pilot, synchronizing, and paging channels, 80% is allocated for traffic. If 12% of that 80% is needlessly used to maintain a poor link, the system capacity is reduced.

Figure 6:
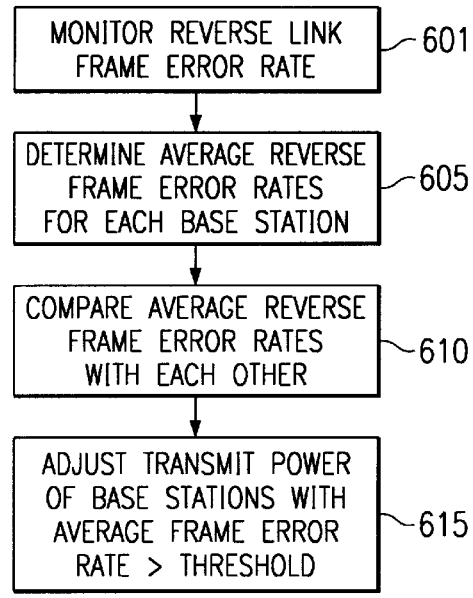
FIG. 6 is a flowchart which illustrates a power synchronizing process.

FIG. 6 is a flowchart which illustrates a power synchronizing process. Referring now to FIG. 6, the power control synchronizing process of the present invention illustrates synchronizing the power levels of the base stations during soft hand-off. This is accomplished by adjusting the gains of base stations having poor quality reverse links to the gain of the base station having the highest quality reverse link.

The process begins by the base station controller monitoring the reverse link frame error rate (step 601) over a period of a predetermined number of frames. In the preferred embodiment, the predetermined number of frames is 20. Alternate embodiments monitor over other periods.

The reverse link frame error rate provides an indication of the fast forward link power control bit error rate for that particular base station. It can be assumed that if the reverse link frame error rate is high, the fast forward link power control bit error rate is also going to be high.

Figure 5:
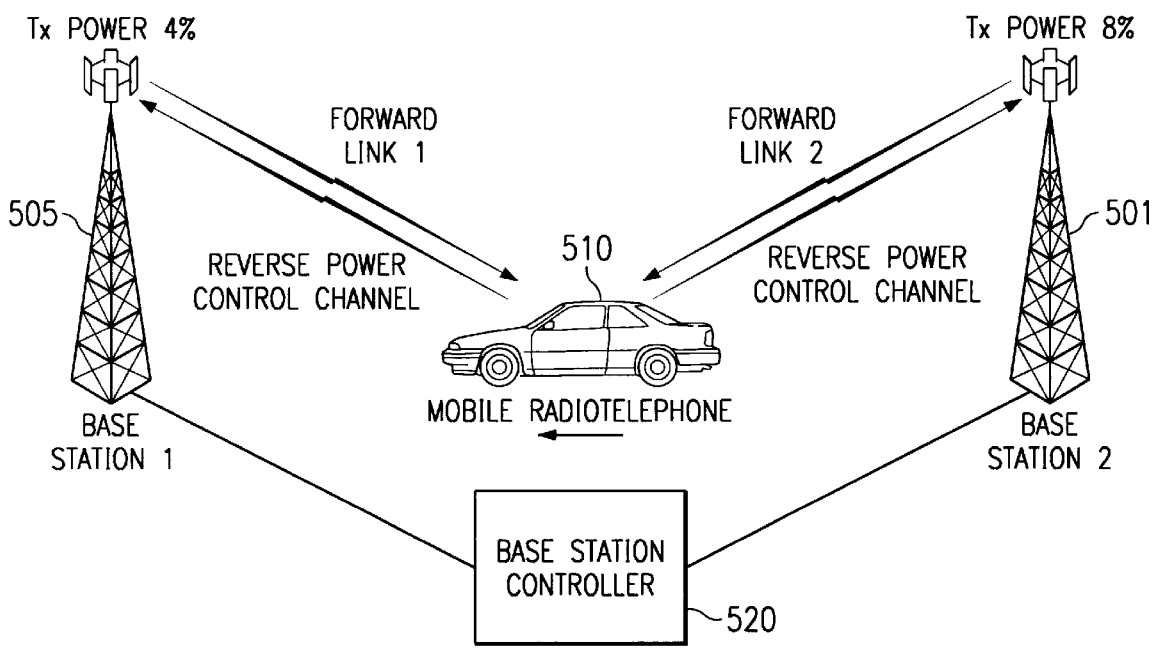
FIG. 5 is a communication network which illustrates a radiotelephone communication system in communication with a mobile radiotelephone.

The base station controller (520) monitors the reverse link of each base station involved in the soft hand-off. FIG. 5 shows the base station controller (520) controlling both base station 1 (505) and base station 2 (501). However, in alternate embodiments, the base station controller (520) monitors the reverse link of base stations coupled to other base station controllers.

For example, in an intersystem soft hand-off, each system has its own base station controller that monitors its own base stations. In this case, the two base station controllers need to pool all of the reverse link information together.

Referring to FIG. 6, the average reverse frame error rates are computed for each base station (step 605) and compared with each other (610). This determines the link with the best average reverse frame error rate. The length of the frame period is chosen by the operating software at the base station controller.

Each of the average reverse frame error rates are compared to a predetermined frame error rate percentage threshold (step 610). In the preferred embodiment, this threshold is set by the link with the best average reverse frame error rate. Alternate embodiments set the threshold as a data parameter.

If any of the average reverse frame error rates are greater than the predetermined percentage threshold, the transmit power of those links is adjusted by the base station controller (step 615). The transmit power is adjusted to the last known transmit power of the base station having the lowest average frame error rate over that predetermined frame period.

In the embodiment of FIG. 5, this process results in the base station controller (520) scaling the transmit power of base station 2 (501) down to the last known value of the transmit power of base station 1 (505). By synchronizing the transmit power of multiple base stations, the power of one base station is not reduced too far such that the communication link is lost. Reducing the transmit power of base station 2 (501) to zero could possibly cause the radiotelephone (510) to lose diversity with the base stations (501 and 505). Even though this link is of low quality, it may be needed later if the link's bit error rate improves for some reason, such as the radiotelephone (510) reversing course.

The power control synchronizing process of the present invention does not have to be implemented in a fast forward link power control environment. This process operates in any environment requiring transmit power synchronization between multiple base stations. Additionally, even though only two base stations were used in the embodiment of FIG. 5, the transmit power synchronization process works with more than two base stations.

Another process of the present invention that improves fast forward link power control is a data rate change process. This process, illustrated in FIG. 7, adjusts base station transmit power based on the data rate on the forward link.

As the data rate drops on the forward link, such as from full rate to half rate or half rate to eighth rate, the $E_s/N_o$ requirements for successful demodulation are also typically reduced. If the base station changed to a lower rate and the transmit power is not adjusted, the base station is transmitting at a higher power level than is required to maintain a target $E_s/N_o$.

Figure 7:
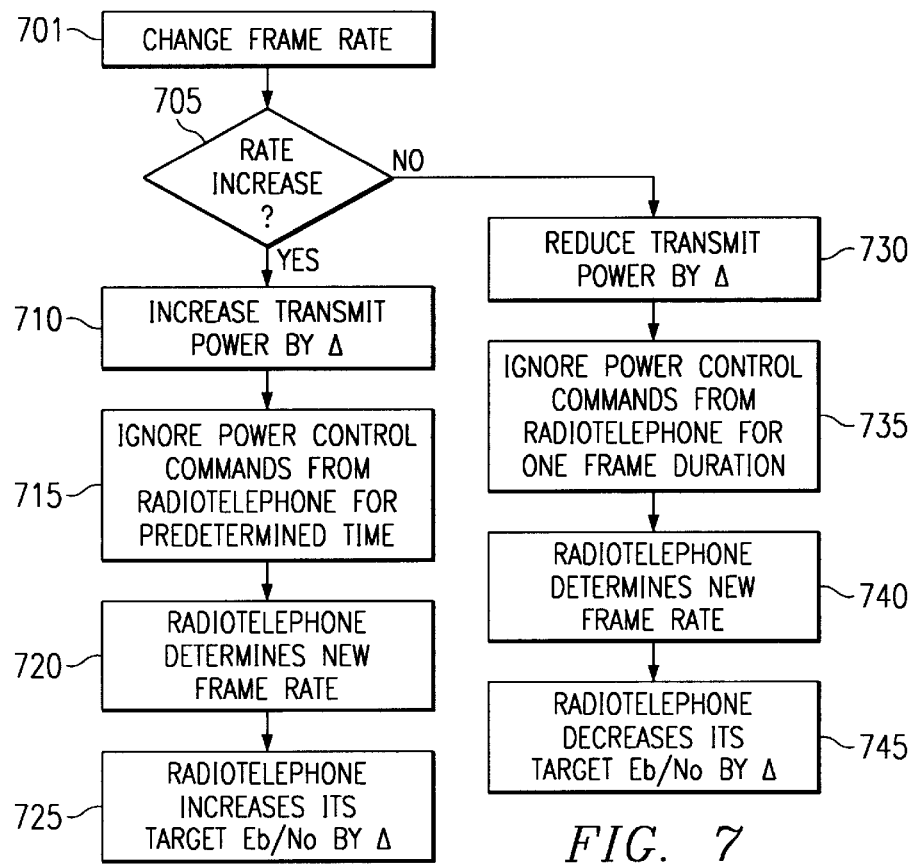
FIG. 7 is a flowchart which illustrates a data rate change power control process.

Referring to the process of FIG. 7, the base stations first change the data rate (step 701). If the change was a frame rate decrease (step 705), the lower rate requires less power so that the base station also reduces transmit power (step 730). In the preferred embodiment, the transmit power is decreased by a predetermined $D_{rate\_x\ to\ rate\_y}$dB where rate_x is the higher rate and rates is the lower rate.

The $D_{rate\_x\ to\ rate\_y}$ value is initially a default value that has been determined by experimentation to be appropriate for the particular area in which the base station is located. In the preferred embodiment, the radiotelephone continuously modifies $D_{rate\_x\ to\ rate\_y}$ as described subsequently. Alternate embodiments use the default settings for $D_{rate\_x\ to\ rate\_y}$ without alteration.

Since there are four different data rates (full, ½, ¼, and ⅛) in IS-95, there are six different predetermined power D's in the present invention: $D_{full\ to\ \frac{1}{2}}$, $D_{full\ to\ \frac{1}{4}}$, $D_{full\ to\ \frac{1}{8}}$, $D_{1/2}$ to ¼, $D_{1/2}$ to ⅛, and $D_{1/4}$ to ⅛. For example, if the base station lowers its rate from full to ¼, then the base station reduces its transmit power by $D_{full\ to\ \frac{1}{4}}$. There are also six different predetermined power D's that apply when the data rate is increased. However, in the preferred embodiment these D's are the same as the D's used for the decrease in data rate. For example, $D_{1/4\ to\ full} = D_{full\ to\ \frac{1}{4}}$. Alternate embodiments use different predetermined power D's for the same rate increase/decrease.

The $D_{rate\_x\ to\ rate\_y}$ is communicated from the base station to the radiotelephone as a special message on the forward traffic channel before a call starts. This value is stored in the radiotelephone for future use so that the power and target $E_s/N_o$ changes effected by both the base station and the radiotelephone are synchronized.

Referring again to the process of FIG. 7, after the transmit power reduction by the base station, the radiotelephone is expecting a certain target $E_s/N_o$ for the previous power level since it is not yet aware of the rate and power reduction. The radiotelephone, therefore, sends a power control command back to the base station instructing the base station to power up. The base station, obviously aware of the rate and power reduction, ignores the power control command from the radiotelephone for one frame duration (step 735). The frame duration is configured to account for processing and propagation delays.

After a certain amount of time has elapsed, the radiotelephone has had time to demodulate the frame and now realizes that the data rate has been decreased (step 740). The radiotelephone then decreases its target $E_s/N_o$ by the same $D_{rate\_x\ to\ rate\_y}$ (step 745) since it has this D stored.

If the data rate increases (step 705), the average $E_s/N_o$ requirements are higher. In this case, the base station increases its transmit power by $D_{rate\_x\ to\ rate\_y}$ (step 710). The base station then ignores all power control commands for a predetermined length of time (step 715). In a preferred embodiment, this length of time is for a frame duration.

The radiotelephone then receives and demodulates the first frame after the rate change. From this, the radiotelephone determines the new frame rate (step 720) and modifies the target $E_s/N_o$ to increase by $D_{rate\_x\ to\ rate\_y}$ (step 725).

In order to modify/optimize the D values, the radiotelephone continuously monitors the average $E_s/N_o$ required for each frame rate as it operates. The above six power D's are then determined by subtracting the appropriate $E_s/N_o$ values:

$$\Delta_{full-to-1/4} = \overline{(E_s/N_o)}_{full} - \overline{(E_s/N_o)}_{1/4}.$$

For example, as a radiotelephone operates, it determines that the average $E_s/N_o$ required for eighth rate frames for the last N eighth rate frames is 5 dB and the average $E_s/N_o$ required for full rate frames within the last N full rate frames is 8 dB. For this example, $D_{full\ to\ 1/8} = 3$ dB.

The modified D's are then transmitted to the base station. The D values are stored in the radiotelephone. In one embodiment, the radiotelephone has one D value stored for a rate increase and another D value for a rate decrease.

Alternate embodiments use only the fixed default values for D. Additionally, other embodiments modify the D values using other techniques than averaging the $E_s/N_o$ requirements for each frame rate.

Ideally, the radiotelephone should never be given too much power. Therefore, in the preferred embodiment, the radiotelephone in the service area sends the D estimates to the network. The network determines from all of the received D's, through an averaging technique, what D increase should be used and what D decrease should be used. This may then be transmitted to the radiotelephone as a message over the forward link enabling these values to be periodically adjusted. The above scheme is extendable to higher data rates having a larger number of subrates.

The preferred embodiment of this process operates in a fast forward link power control environment. The data rate change process of the present invention, however, is not limited to fast forward link power control. The data rate change process is also not required for proper operation of the fast forward link power control process of the present invention.

The performance benefits of using the fast forward link power control process varies as a function of the radiotelephone's speed and location. Traveling at higher speeds, it may be desirable to use the current IS-95 implementation of forward link power control, subsequently referred to as IS-95 forward power control. At the higher speeds, the fast forward power control process of the present invention does not produce as great a performance gain as it does at slower speeds in terms of capacity per given grade of service.

At higher speeds, the radiotelephone travels through fades too rapidly for the fast forward power control process to update/track the base station's transmit power. Additionally, the error correction built in to the radiotelephone can handle the rapid fading and the interleaving of data bits.

Faster speeds may require the use of the IS-95 forward power control for better performance. The power control trigger process of the present invention triggers a switch to the IS-95 forward power control from the fast forward link power control process when the radiotelephone's speed goes above a predetermined speed threshold. Below this threshold, the fast forward link power control process produces increased performance over prior art processes.

Alternate embodiments determine the speed and/or location information in different ways. In one embodiment, the location and speed information is determined from a global positioning receiver built into the radiotelephone. The base station also may determine the speed of the radiotelephone using any one of known techniques such as round trip delay measurements and Doppler frequency estimates.

For the power control trigger process, the radiotelephone periodically transmits its speed information to the base station(s) with which it is communicating. In the preferred embodiment, the speed information is part of a message sent on the reverse power control channel. Alternate embodiments transmit the speed information on the reverse traffic channel.

The radiotelephone's hand-off status is also a trigger for switching between the prior art process of power control and the fast forward link power control process of the present invention. When communicating with two or more base stations, the performance obtained by using the fast forward link power control process may not be superior to that of IS-95 forward power control.

Figure 8:
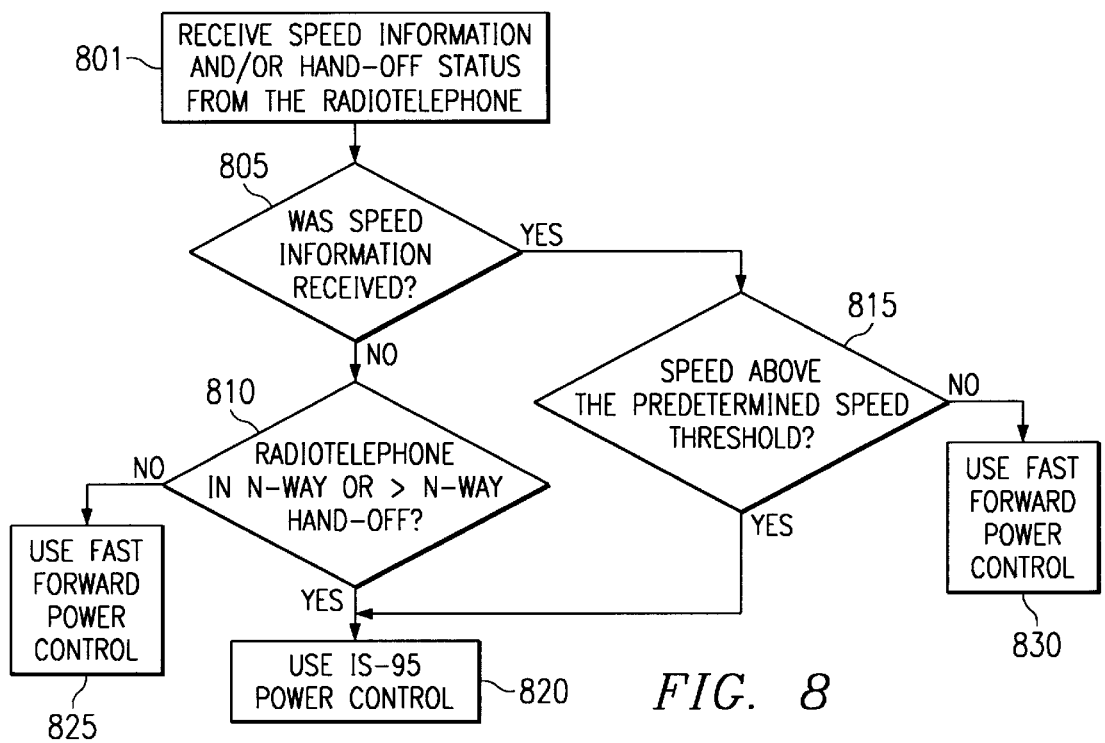
FIG. 8 is a flowchart which illustrates a power control trigger process.

A flowchart of the power control trigger process of the present invention is illustrated in FIG. 8. The process begins by the base station receiving the speed and/or hand-off status from the radiotelephone (step 801). In the preferred embodiment, this information is sent over the reverse power control signaling channel. The base station then determines if speed information was received (step 805).

If speed information was received, the base station compares the received speed information with the predetermined speed threshold (step 815). If the speed information indicates that the radiotelephone's speed is less than the threshold, the fast forward power control process of the present invention is used (step 830). If the speed information indicates the radiotelephone's speed is greater than the threshold, the prior art IS-95 power control is used (step 820).

If the radiotelephone's hand-off status was received (step 805), the number of base stations (cells) is compared to the hand-off link threshold (step 810). If the number of base stations is less than the threshold, the fast forward power control process of the present invention is used (step 825). If the number of base station is greater than the threshold, the prior art IS-95 power control is used (step 820).

In the power control trigger process, once the base station controller determines that IS-95 power control is to be used, it simply ignores the power up/down commands coming from the radiotelephone. To determine the starting power value in IS-95 power control, the base station uses the last power value from fast forward power control. Similarly, when switching from IS-95 power control to fast forward power control, the base station controller instructs the base stations to start using the power up/down commands coming from the radiotelephone.

Figure 9:
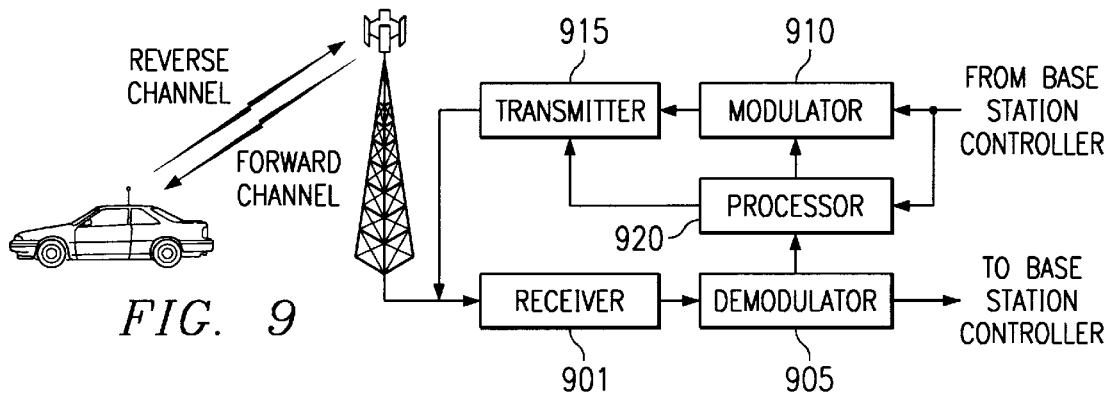
FIG. 9 is a block diagram which illustrates a base station according to another aspect of the present invention.

FIG. 9 illustrates a base station of the present invention. The base station is comprised of a receiver 901 for receiving the radio signals from the radiotelephone over the reverse traffic channel and the reverse power control signaling channel. The received signal is input to a demodulator 905 for demodulation. The demodulated signal is sent to the base station controller for routing to the appropriate destination.

A modulator 910 is used to modulate any signal from the base station controller to be transmitted. The modulated signal is transmitted, at the power set by the transmitter 915, over the forward channel.

The transmit power of the transmitter is controlled by the base station processor 920. The processor receives the power control commands from the demodulator 905 and power control information from the base station controller, interprets them, and adjusts the transmit power accordingly.

The reverse power control signaling channel has the ability for communicating various information from the radiotelephone to the base station. This information includes the power control information, the rate change information, the pilot strength information, velocity information, and the frame quality information on forward link frames. Additionally, if the radiotelephone is equipped with global positioning system or other navigation hardware, the reverse power control signaling channel can handle position information. Other embodiments use the reverse power control signaling channel for other information required to be transmitted from the radiotelephone to the base station(s).

The above information transmitted over the reverse power control signaling channel may be transmitted periodically, such as in the case of pilot strength information. The information may be transmitted continuously, such as in the case of the power control information. The rate change information may be transmitted only when it occurs. In one embodiment, the information is formatted as a predetermined protocol to reserve locations in the frames for the various bits of information. Other embodiments transmit the information on an as needed basis.

In summary, the above described power control process of the present invention is comprised of many beneficial aspects. A reverse power control signaling channel and a reverse pilot channel are used to communicate power control commands from the mobile radiotelephone to the base station. The power control commands are based on an estimated $E_s/N_o$.

Another benefit of the above invention occurs during soft hand-off. The process of the present invention synchronizes the power of the base stations communicating with the mobile radiotelephone. This has the effect of decreasing base station transmit power thereby increasing capacity.

Additionally, capacity is increased by changing the base station transmit power when the data rate is changed. By decreasing transmit power when the data rate decreases and increasing transmit power when the data rate increases, system capacity is improved while maintaining grade of service.

In reference to the foregoing discussions with respect to power control, the mobile radiotelephone's speed and hand-off status is used to choose a power control process. A faster speed and/or large number of hand-off links indicates that the IS-95 power control process should be used. A slower speed and/or low number of hand-off links indicates that the power control process of the present invention should be used. Moreover, the foregoing discussions, which considered the single carrier network, apply equally to a multi-carrier CDMA network. Accordingly, the following discussion of multi-carrier systems or networks is presented prior to the discussion of power control in a multi-carrier system or network.

Figure 10:
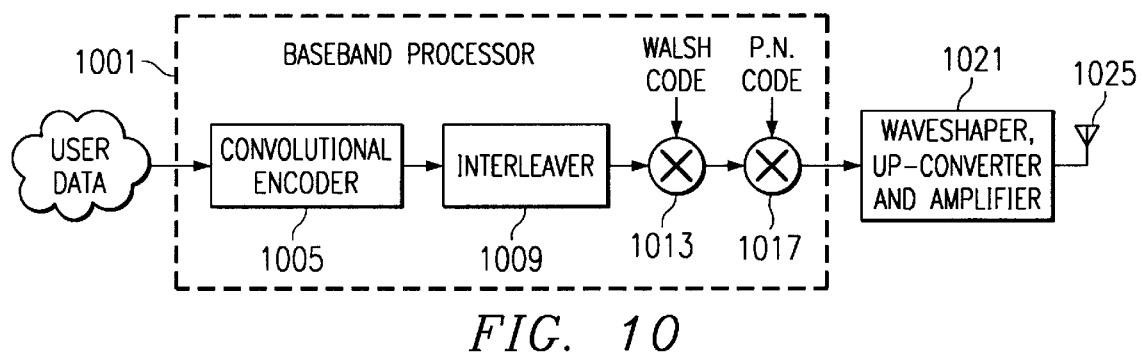
FIG. 10 is a functional block diagram which illustrates a direct spread CDMA system.

FIG. 10 is a block diagram which illustrates a spread spectrum CDMA system. Referring now to FIG. 10, a baseband processor 1001 is connected to receive user data into transmit process data to a wave shaper, upconverter & amplifier 1021 for transmission therefrom. As may be seen, convolutional encoder 1005 of baseband processor 1001 is connected to interleaver 1009 which, in turn, is sequentially connected to circuit 1013 and then circuit 1017. The output of circuit 1017 then is produced to wave shaper, upconverter and amplifier 1021.

Encoder 1005, which initially receives the user data, is a convolutional encoder. Encoder 1005 has a code rate of 1/M, where M is typically equal to 3. While encoder 1005 is a convolutional encoder, it may be replaced by any of different types of error correcting encoders. As is known by those skilled in the art, the purpose of a convolutional encoder is to create redundancy in the original data sequence. Such redundancy improves error correction and signal reconstruction at the receiver and is not difficult to implement in spread spectrum systems.

The output of encoder 1005 is transmitted to block interleaver 1009 which interleaves the convolutionally encoded data stream. As is known to those skilled in the art, interleaving data effectively creates time diversity which is used to overcome the effects of signal fading. Accordingly, by convolutionally encoding and interleaving user data in a specified manner, a receiver may use error correction techniques as it de-interleaves and decodes the received data in the specified manner to reconstruct the original user data. Block interleaver 1009 then transmits the interleaved data to a circuit 1013 which combines the interleaved data with a Walsh code. Circuit 1013 then transmits its output to circuit 1017 which combines the Walsh coded data with a pseudo-noise sequence code. The data is then output from circuit 1017 to wave shaper, up-converter and amplifier 1021. The wave shaper, upconverter and amplifier 1021 boosts the signal to a proper power level and carrier frequency and outputs the results having a system bandwidth which is an integer multiple of 1.25 MHz. For example, the bandwidth might be 3.75 MHz.

As may be seen from examining FIG. 10, the output data is convolutionally encoded and interleaved and then combined with the Walsh code and PN code over the entire system bandwidth, here 3.75 MHz. One clear advantage to the system of FIG. 1 is that the bandwidth has been tripled from that defined in IS95. This improvement supports future bandwidth requirements for increased data transmissions.

Figure 11:
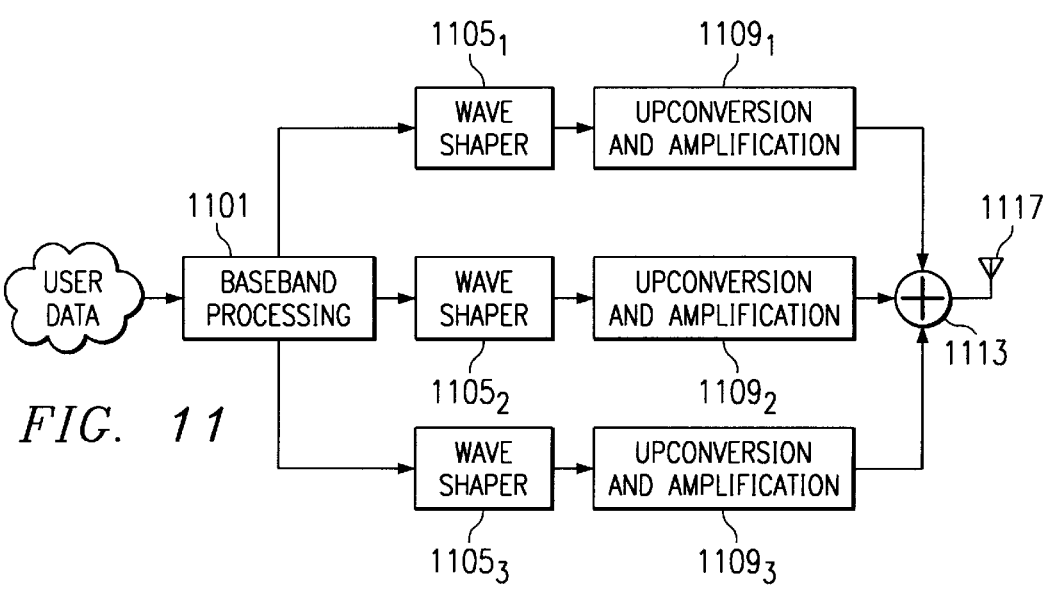
FIG. 11 is a functional block diagram illustrating a multi-carrier transmitter for the transmission of user data over multiple carriers.

FIG. 11 is a block diagram illustrating a multi-carrier transceiver for the transmission of user data over multiple carriers. Referring now to FIG. 11, baseband processor 1101 is connected to receive user data. Baseband processor 1101 also is connected to wave shapers $1105_1$, $1105_2$ and $1105_3$ to produce separate outputs thereto. Wave shapers $1105_1$, $1105_2$ and $1105_3$, in turn, are connected to upconversion and amplification circuits $1109_1$, $1109_2$ and $1109_3$, respectively. Upconversion and amplification circuits $1109_1$, $1109_2$ and $1109_3$ are connected to produce outputs to circuits 1113 for combining and transmitting from antenna 1117. In operation, user data is input to baseband processing circuitry 1101 where it is coded, repeated (if necessary), interleaved and then de-multiplexed into a plurality of channels. Each of the plurality of channels is then coded with a Walsh code and with a Pseudo-Noise sequence. All of the forgoing processing is referenced herein as baseband processing. The plurality of channels output from baseband processing circuitry 1101 are then transmitted to a plurality of wave form shaping circuits $1105_N$. Each of the de-multiplexed outputs from baseband processing circuitry 1101 forms a separate 1.25 MHz bandwidth channel. The wave form shaping circuits 1105$_N$ perform wave form shaping for each of the channels. The output of wave form shaping circuit 1105$_1$ is transmitted to circuitry 1109$_1$ for up-converting the baseband channel to the desired carrier frequency and for providing power amplification for transmission. Similarly, the output of wave form shaping circuit 1105$_2$ is transmitted to circuitry 1109$_2$ for up-converting to the second carrier frequency and for providing power amplification. As may be seen, each wave form shaping circuit 1105$_N$ produces its output to the upconversion and power amplification circuitry 1109$_N$. The outputs of each of the upconversion power amplification circuits 1109$_N$ are then transmitted to summing circuit 1113 which combines the outputs of the circuits 1109$_N$. The combined signals are then output and transmitted through antenna 1117 to a specified receiver. The combining could be performed at baseband, Intermediate Frequency (IF) or Radio Frequency (RF). In the system of FIG. 11, however, the combining occurs at RF.

Figure 12:
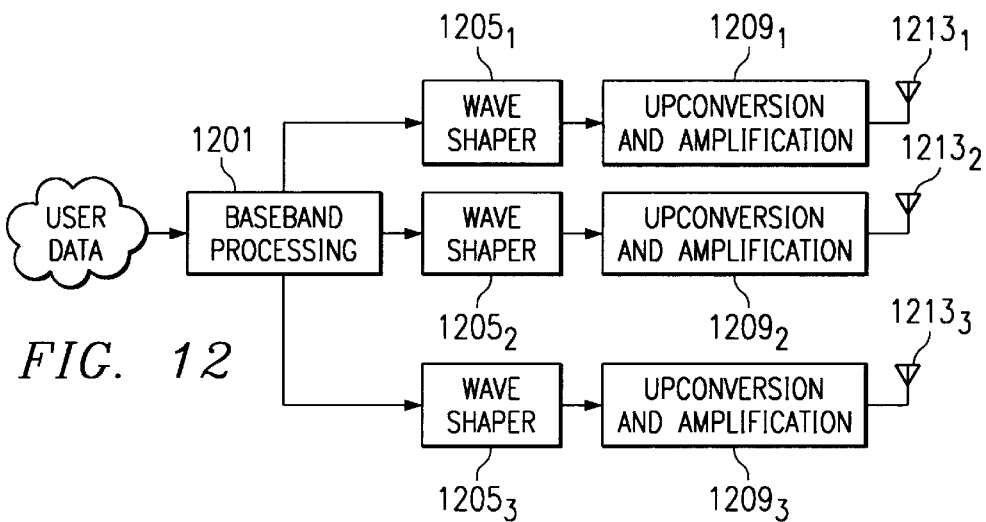
FIG. 12 is a functional block diagram of a multi-carrier system with transmission of each carrier on a different antenna.

FIG. 12 is a functional block diagram of a multi-carrier system with transmission of each carrier on a different antenna. Referring now to FIG. 12, baseband processor 1201 is connected to receive user data. Baseband processor 1201 also is connected to wave shapers 1205$_1$, 1205$_2$ and 1205$_3$ to produce separate outputs thereto. Wave shapers 1205$_1$, 1205$_2$ and 1205$_3$, in turn, are connected to upconversion and amplification circuits 1209$_1$, 1209$_2$ and 1209$_3$, respectively. The outputs of upconversion and amplification circuits 1209$_1$, 1209$_2$ and 1209$_3$ are then transmitted from antennas 1213$_1$, 1213$_2$ and 1213$_3$, respectively. The user data is input to baseband processing circuitry 1201 for the purpose of error coding, repeating (if necessary), interleaving and de-multiplexing. The resulting de-multiplexed output is then coded with Walsh codes and P-N sequences. This baseband processed data is transmitted as separate channels to waveform shaping circuits 1205$_1$, 1205$_2$ . . . 1205$_N$. The resulting output channels of data of the wave form shaping circuits 1205$_1$ through to 1205$_N$ are then transmitted to upconversion and power amplification circuits 1209$_1$, 1209$_2$ . . . 1209$_N$, respectively to be transformed to their respective carrier frequency. The nominal bandwidth of each carrier is 1.25 MHz. The carrier outputs of the upconversion power amplification circuits 1209$_1$ through 1209$_N$ are then transmitted through antennas 1213$_1$ through 1213$_N$, respectively. As may be seen, there is one antenna for each carrier. The antennas 1213$_1$, 1213$_2$ . . . 1213$_N$ are separated in space and/or have orthogonal polarization.

The system of FIG. 12 provides multiple benefits. First, backwards compatibility is maintained with IS95 receivers because it includes baseband processing circuitry and upconversion and power amplification circuitry which manipulates data for a unique 1.25 MHz bandwidth carrier with Walsh codes orthogonal to IS95 carriers. Additionally, having circuitry to process data over N carriers increases the bandwidth to a desired amount for meeting future data transmission throughput requirements. In addition to these improvements, having a plurality of antennas, one for each carrier allows maximum diversity. Accordingly, as the transmissions from the antennas 1213$_N$ are received by a receiver, the mobile unit is better able to reconstruct the received signals using known signal decoding and reconstruction techniques and to reduce the effects of fading.

Figure 13:
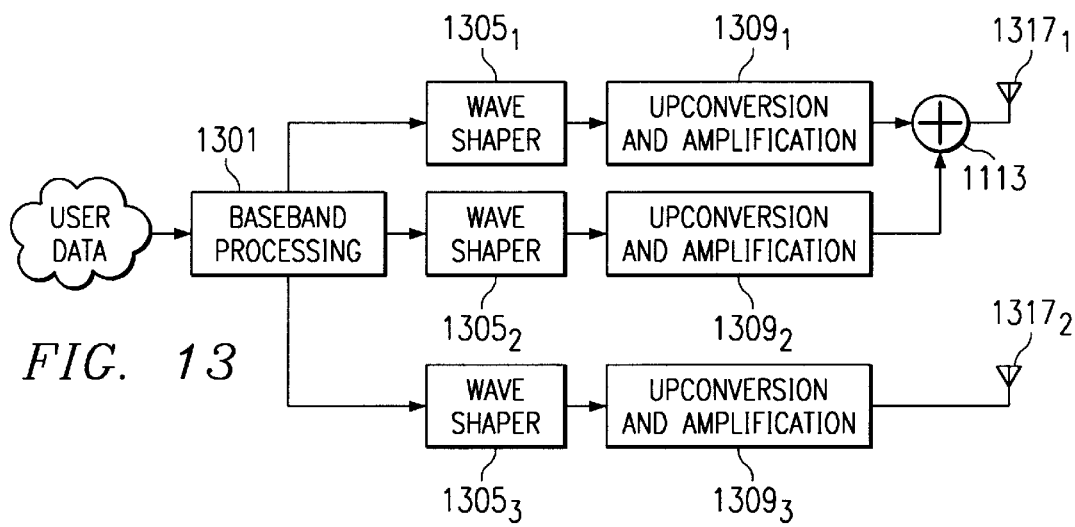
FIG. 13 is a functional block diagram of a multi-carrier system with a hybrid antenna configuration.

FIG. 13 is a functional block diagram of a multi-carrier system with a hybrid antenna configuration. A hybrid antenna configuration is one in which at least two antennas transmit a different number of carriers relative to each other.

Referring now to FIG. 13, baseband processor 1301 is connected to wave shapers 1305$_1$, 1305$_2$ and 1305$_3$ to produce separate outputs thereto. Wave shapers 1305$_1$, 1305$_2$ and 1305$_3$, in turn, are connected to upconversion and amplification circuits 1309$_1$, 1309$_2$ and 1309$_3$, respectively. The outputs of upconversion and amplification circuits 1309$_1$ and 1309$_2$ are connected to circuit 1313 which combines the received outputs to produce a single output. The output of circuit 1313 is connected to antenna 1317$_1$ for transmission therefrom. The output of upconversion and amplification 1309$_3$, however, is connected directly to antenna 1317$_2$ for transmission therefrom. In operation, user data is input into baseband processing circuitry 1301 for baseband processing. The de-multiplexed output of circuitry 1301 is then transmitted to wave form shaping circuits 1305$_1$ through 1305$_N$. The outputs of wave form shaping circuits 1305$_1$ through 1305$_N$ are then transmitted to upconversion and power amplification circuits 1309$_1$ through 1309$_N$, respectively for transformation to the N different carriers. In the specific system of FIG. 13, only 3 carriers are being processed to create a 3.75 MHz signal bandwidth. Accordingly, N is equal to 3 because there are only 3 sets of wave shaping circuits 1305$_N$ and upconversion and power amplification circuits 1309$_N$. As may be seen, the outputs of upconversion power amplification circuits 1309$_1$ and 1309$_2$ are transmitted to summing circuitry 1313 where they are combined at a radio frequency (RF) and then output to antenna 1317$_1$. The output of upconversion and power amplification circuit 1309$_3$, however, is merely output on antenna 1317$_2$. Accordingly, antenna 1317$_1$ transmits the first two carriers as combined at summing circuitry 1313. The output of upconversion and power amplification circuitry 1309$_3$, however, is transmitted through antenna 1317$_2$ without being combined with the output of another power amplification circuit. Antennas 1317$_1$ and 1317$_2$ are separated in space and/or have orthogonal polarization.

While the system of FIG. 13 provides an improvement over the system of FIG. 11, it does not provide as much diversity as the system of FIG. 12 in some situations. Accordingly, as a receiver receives signals transmitted by the system of FIG. 13, it will, in some circumstances, be less effective at decoding and deinterleaving and reconstructing the received signals due to fading. While the system of FIG. 13 shows only 3 carriers and 2 antennas, it is understood that the teaching of FIG. 13 goes beyond this specific embodiment. For instance, any number of antennas greater than one and less than the total number of N carriers could be used for transmitting the single and combined carriers as produced by the upconversion and power amplification circuits 1301$_n$. Which carriers are combined or transmitted singly is determinable by those skilled in the art practicing the invention disclosed herein. Similarly, whether the individual antennas are chosen to create polarization diversity may be determined by specific transmission requirements for a particular site by those skilled in the art as the invention is practiced.

Figure 14:
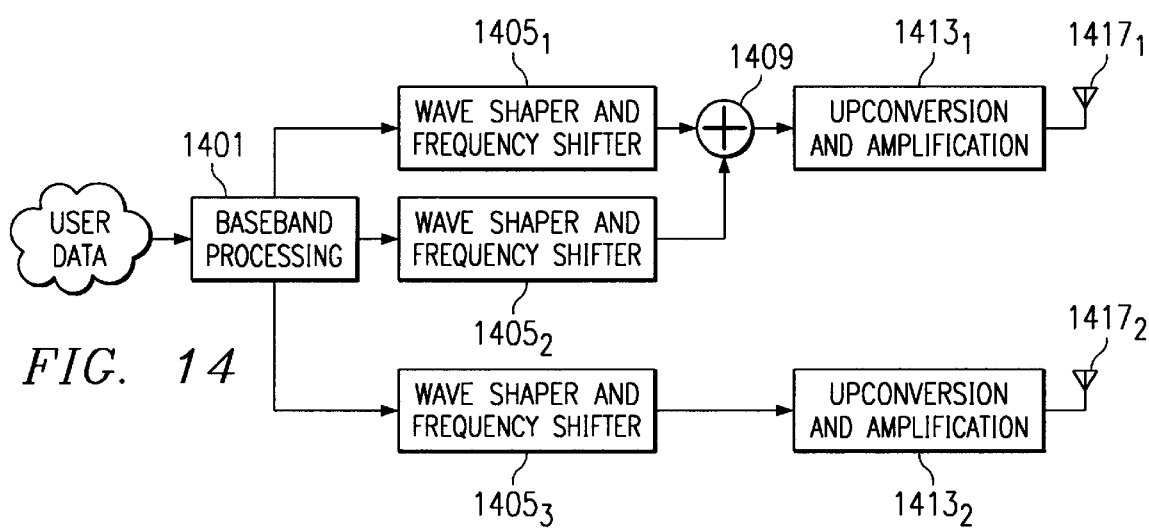
FIG. 14 is a functional block diagram of a multi-carrier system with a hybrid antenna configuration.

FIG. 14 is a functional block diagram of a multi-carrier system with a hybrid antenna configuration. Referring now to FIG. 14, baseband processing circuit 1401 is connected to receive user data. The outputs of baseband processing circuit 1401 are connected to each of a wave shaper and frequency shifter 1405$_1$, 1405$_2$ and 1405$_3$. The outputs of wave shaper and frequency shifter 1405$_1$, 1405$_2$ are connected to circuit 1409. The output of circuit 1409 is connected to upconversion and amplification circuit 1413$_1$. The output of wave shaper and frequency shifter 1405$_3$, however, is connected directly to upconversion and amplification circuit 1413$_2$. The outputs of upconversion and amplification circuits $1413_1$ and $1413_2$ are connected to and transmitted from antennas $1417_1$ and $1417_2$, respectively. In operation, the user data is transmitted to baseband processing circuitry 1401 for baseband processing. The de-multiplexed output of circuitry 1401 is then produced to wave form shaping and frequency shifting circuits $1405_1$, $1405_2$ ... $1405_N$. Here, the output channels of the wave form shaping and frequency shifting circuits $1405_N$ are combined at an intermediate frequency (IF) prior to being up-converted and amplified. If, for example, N=3, it may be seen that the first two channels are combined while the third channel is transmitted singly, as with the system of FIG. 13. A difference, however, is that the outputs of wave form shaping circuits $1405_1$ and $1405_2$ are combined in circuitry 1409 and then transmitted to the upconversion and power amplification circuitry $1413_1$ for transformation to the final frequency band, i.e., to the carrier frequency.

A purpose of including a frequency shifter in the wave form shaping circuitry $1405_1$–$1405_2$ is that each channel which is to be transmitted on a separate carrier should be spaced in frequency relative to the other channels. This is particularly true for the first two channels processed by wave form shaper and frequency shifter circuits $1405_1$ and $1405_2$ since those two channels will receive an equivalent amount of up-conversion to their carrier frequencies by up-conversion and amplification circuit $1413_1$. Because the output of wave form shaper $1405_3$ is produced directly to an upconversion and amplification circuit $1413_2$, there is no requirement for wave shaper $1405_3$ to include a frequency shifter. Accordingly, wave form shaper $1405_3$ includes a frequency shifter which could be removed. This is because the upconversion circuit can translate the signal directly from baseband to the desired carrier frequency.

The up-converted and amplified signal is then transmitted by antenna by $1417_1$. The output of baseband processing circuitry 1401 which is transmitted to wave form shaping circuit $1405_3$, however, is processed and then transmitted without combination to upconversion power amplification circuitry $1413_2$ and then output on antenna $1417_2$. A difference between the system of FIG. 14 and FIG. 13, then, is that the circuitry 1409 for combining signals is placed in between wave form shaping circuits 1405 and the upconversion circuitry 1413 instead of being placed on the output of the upconversion and power amplification circuitry $1309_N$ of FIG. 13. As with the system of FIG. 13, the plurality of carriers are transmitted through a plurality of antennas which are separated in space and/or have orthogonal polarization.

Figure 15:
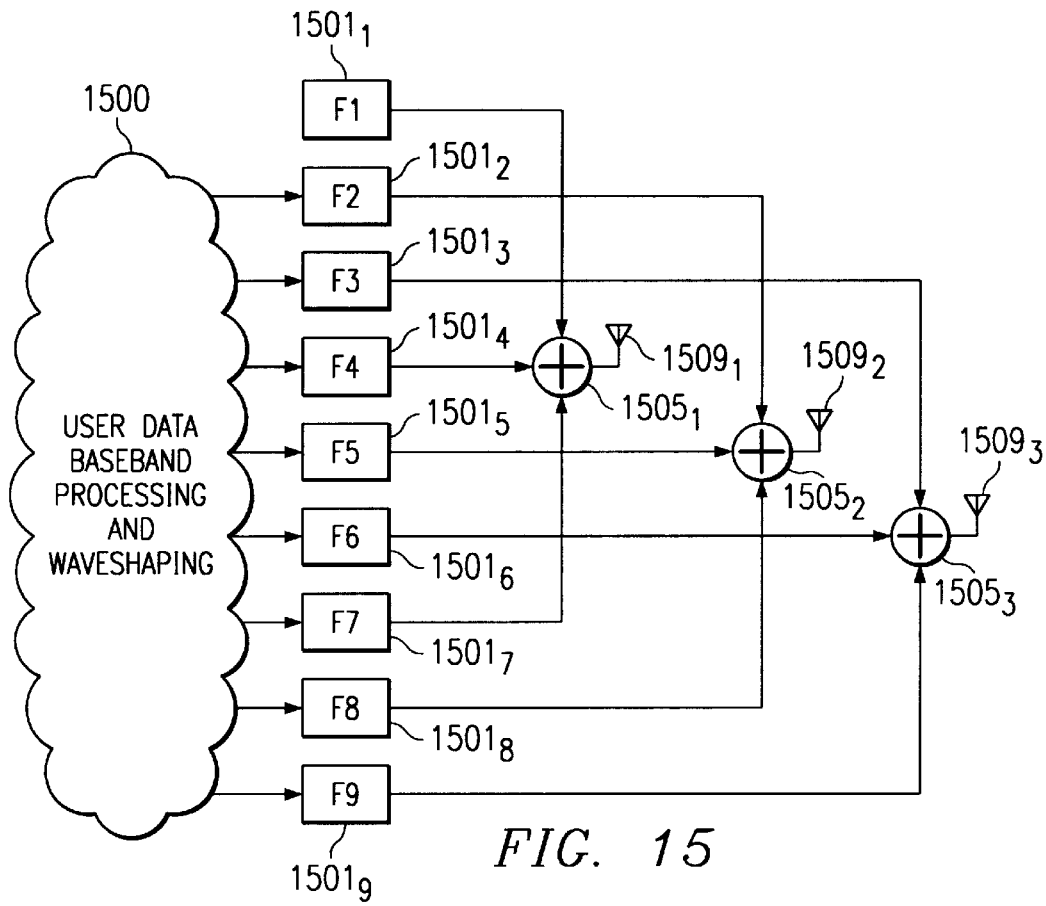
FIG. 15 is a functional block diagram which illustrates a multi-carrier system with a hybrid antenna.

FIG. 15 is a functional block diagram which illustrates a multi-carrier system with a hybrid antenna configuration. Referring now to FIG. 15, a plurality of wave form shaping circuits $1501_1$–$1501_9$ are connected to receive the de-multiplexed output channels for which baseband processing has been performed by the baseband processing circuitry. In the system of FIG. 15, there are nine de-multiplexed channels which are produced to the wave form shaping circuits. For the purpose of simplicity, the combination of the baseband processing circuitry and the wave shaping circuitry is represented by cloud 1500. The configuration of the circuits of cloud 1500 is similar as the configuration of FIG. 12 for the same types of circuits except that nine channels are being processed instead of three channels (as in FIG. 12). The output of the wave form shaping circuits is input into upconversion and power amplification circuitry $1501_1$, $1501_2$ ... $1501_N$ where N is equal to 9 (the number of channels) in the system of FIG. 15. The outputs of the upconversion and power amplification circuits $1501_1$ ... $1501_9$ are input into summing circuits $1505_1$, $1505_2$ and $1505_3$. Summing circuits $1505_1$, $1505_2$, and $1505_3$ then combine the outputs of the upconversion and power amplification circuits $1501_1$ ... $1501_9$ to produce outputs which are transmitted through antennas $1509_1$, $1509_2$ and $1509_3$. As may be seen, summing circuit $1505_1$ combines the outputs of upconversion and power amplification circuits $1501_1$, $1501_4$ and $1501_7$. Similarly, circuit $1505_2$ combines the outputs of upconversion and power amplification circuits $1501_2$, $1501_5$ and $1501_8$ and summing circuit $1505_3$ combines the outputs of upconversion and power amplification circuits $1501_3$, $1501_6$ and $1501_9$. In general, starting with the first upconversion and power amplification circuits $1501_1$, each circuit's output is transmitted through a different antenna until each antenna is designated to an upconversion and power amplification circuit $1501_N$. Thereafter, the allocation pattern repeats itself for the remaining upconversion and power amplification circuits $1501_N$. Accordingly, in the example shown in FIG. 15, every third (after the first) upconversion and power amplification circuit has an output which is combined at a summing circuit for transmission over the first antenna. Similarly, every third (after the second) upconversion and power amplification circuit has an output which is combined at a summing circuit for transmission over the second antenna. Finally, every third (after the third) upconversion and power amplification circuit has an output which is combined at a summing circuit for transmission over the third antenna.

This combination pattern may be repeated for different antenna configurations. If, by way of example, the system includes four antennas, then every fourth (after the first, second, etc.) upconversion power amplification circuit output is combined. The purpose of combining the outputs of the wave shaping, upconversion and power amplification circuits in this manner is to minimize the effects of fading. More specifically, the information within a given signal is distributed through the differing antennas in this way to improve the frequency diversity created by separate transmission of the frequency bands over the multiple antennas. With respect to the system of FIG. 15, either the number of upconversion and power amplification circuits may be changed or the number of antennas and corresponding summing circuits may be changed. The circuitry pattern which defines what outputs are combined, however, is kept the same regardless of the number of circuits or antennas.

Figure 16:
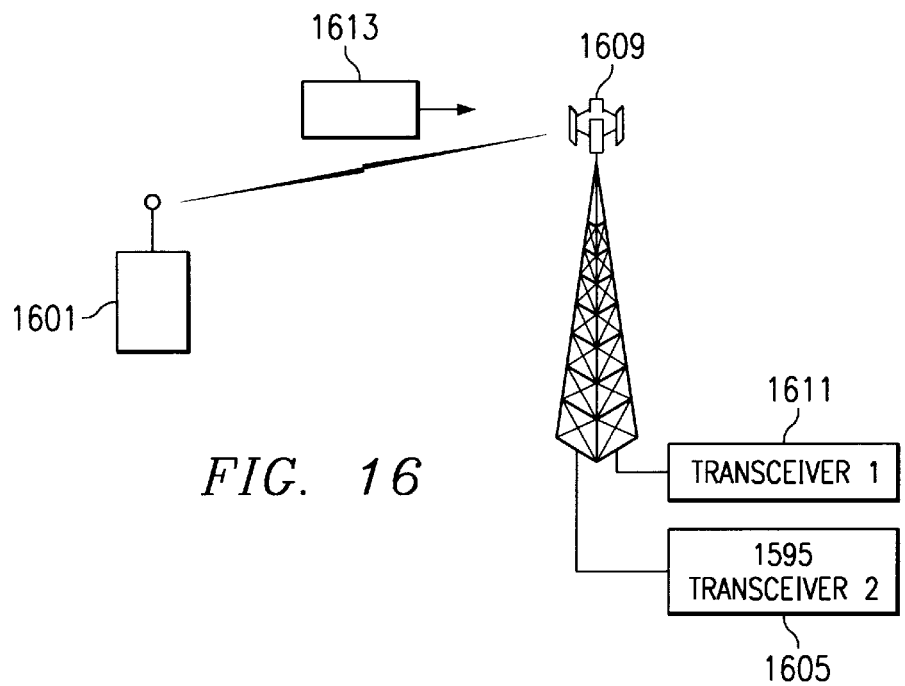
FIG. 16 is a block diagram which illustrates a second aspect of the multi-carrier transceiver in a multi-carrier network according to the embodiments of the invention.

FIG. 16 is a block diagram which illustrates a second aspect of the multi-carrier transceiver in a multi-carrier network. Referring now to FIG. 16, a mobile transceiver 1601 is coupled to communicate with transceiver 1605 through antenna 1609. Similarly, mobile transceiver 1601 is coupled to communicate with transceiver 1611 through antenna 1609. For the system shown in FIG. 16, mobile transceiver 1601 responds to control channel signals transmitted by IS-95 transceiver 1605 and by multi-carrier transceiver 1611, both through antenna 1609, by transmitting a signal 1613. In one embodiment, both transceiver 1605 and 1611 attempt to receive and interpret signal 1613. Only the transceiver which is of the type to communicate with mobile transceiver 1601 will be able to receive and interpret signal 1613. To the other transceiver, signal 1613 will merely appear to be noise. Accordingly, the transceiver which receives the response will continue to communicate with mobile transceiver 1601. In another embodiment, signal 1613 is transmitted as an IS-95 protocol signal and it includes a mobile identification number (MIN) which identifies the mobile transceiver 1601 as being either an IS-95 or multi-carrier type of transceiver. For this embodiment, if the mobile transceiver 1601 is an IS-95 transceiver, transceiver 1605 will continue to communicate with it. If, however, signal 1613 identifies it as being a wide band transceiver, then transceiver 1605 hands off the call to transceiver 1611 so that it and mobile transceiver 1601 may communicate in a wide band mode. As may be seen, there is potential for interference between IS95 transceivers and the multi-carrier transceivers. However, because the multi-carrier transceivers operate over a plurality of 1.25 MHz carriers, orthogonal Walsh codes may be used on the forward link (base station to mobile unit) to reduce interference between the IS-95 transceivers and the wide band multi-carrier transceivers.

Figure 17:
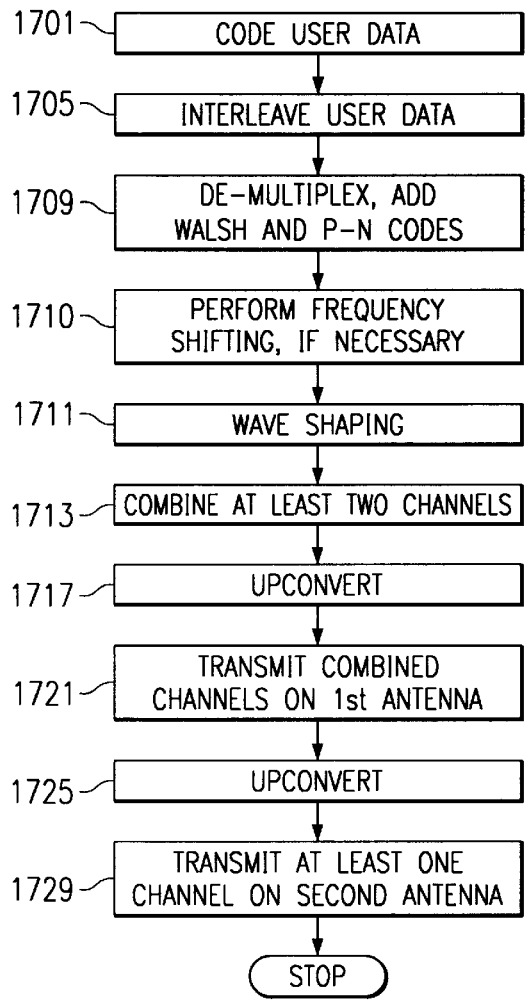
FIG. 17 is a logic flow diagram which illustrates a method of transmitting multiple carriers in a multi-carrier system.

FIG. 17 is a logic flow diagram which illustrates a method of transmitting multiple carriers in a multi-carrier system. Referring now to FIG. 17, user data is initially convolutionally coded (step 1701), interleaved (step 1705), demultiplexed to create a plurality of channels of data, then each channel is processed (step 1709) to add Walsh codes and PN sequences. The plurality of channels of data are frequency shifted to different 1.25 MHz frequency bands, if necessary (step 1710) and then are wave form shaped by a plurality of wave form shapers (step 1711) for transmission. The steps of coding and interleaving of user data, wave form shaping and frequency shifting are performed for all the data at one time by one or more base band processors. Whether frequency shifting of the channels is necessary depends upon the circuit configuration. Frequency shifting of the channels is necessary whenever channels are to be combined prior to being up-converted to their carrier frequencies.

After the processing of step 1711 occurs, two channels are combined by a summing circuit (step 1713). Thereafter, the two channels which were combined are up-converted to a carrier frequency band to create a combined carrier (step 1717). Thereafter, the combined carriers are transmitted from a first antenna (step 1721). At the same time that steps 1713, 1717 and 1721 are being performed, a third channel is up-converted to a second carrier and is amplified for transmission from a second antenna (step 1725). Thereafter, the third channel on the second carrier is transmitted (step 1729).

In another embodiment of the invention, steps 1713 and 1717 of FIG. 17 may be interchanged in terms of sequential order as is indicated by arrow 1719. In other words, the step of up-converting the combined channels of 1717 can occur before the step of combining the two channels. In this embodiment, because the step of up-converting (step 1717) occurs prior to the step of combining (step 1713), the two channels may be up-converted to different carrier frequencies. For this embodiment, therefore, two carriers are transmitted from the first antenna and third carrier is transmitted from the second antenna.

In the method of FIG. 17, the two channels are up-converted individually to separate carriers and then combined in step 1713. If there are more than two channels to be combined, however, the step of combining the two channels may be repeated for any group of channels which are to be combined. Additionally, if there are 4 channels, then steps 1725 and 1729 would include up-converting and transmitting two channels instead of one. The inventive method is not limited, therefore, to merely combining and transmitting the specific numbers of carriers shown. The numbers of carriers combined, therefore, depends on the number of carriers in relation to the number of antennas.

Referring again to FIG. 15, the steps of combining carriers of FIG. 17 would occur three times. As may be seen from referring to FIG. 15, the channels and carriers output from F1, F4 and F7 are combined in one step, the channels and carriers from F2, F5 and F8 are combined in a second step, and channels and carriers from F3, F6 and F9 are combined in a third step. As the above discussion of FIG. 15 illustrates, however, the method of FIG. 17 may readily be modified to account for and includes the combination of three or more sets of channels and their transmission over three or more antennas.

Figure 18:
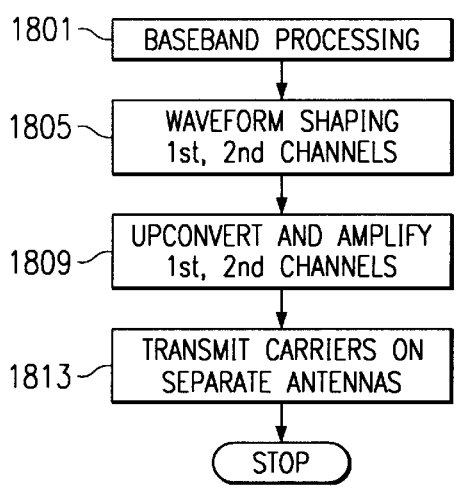
FIG. 18 is a logic flow diagram which illustrates a method of transmitting multiple carriers in a multi-carrier system.

FIG. 18 is a logic flow diagram which illustrates a method of transmitting multiple carriers in a multi-carrier system. Referring now to FIG. 18, a multi-carrier transceiver receives user data and performs routine baseband processing therefor (step 1801) and produces a first and a second de-multiplexed channel. The first and second channels are then transmitted to a first and a second wave form shaping circuits (one for each channel, respectively) for converting the signals in the first and second channels from a digital form to a form suitable for transmission over the airwaves (step 1805). The outputs of the first and second waveform shaping circuits are transmitted to a first and a second circuit for up-converting to a first and second carrier and for amplifying the first and second channels on the first and second carriers (step 1809). Thereafter, the first and second carriers are transmitted on different antennas (step 1813).

Figure 19:
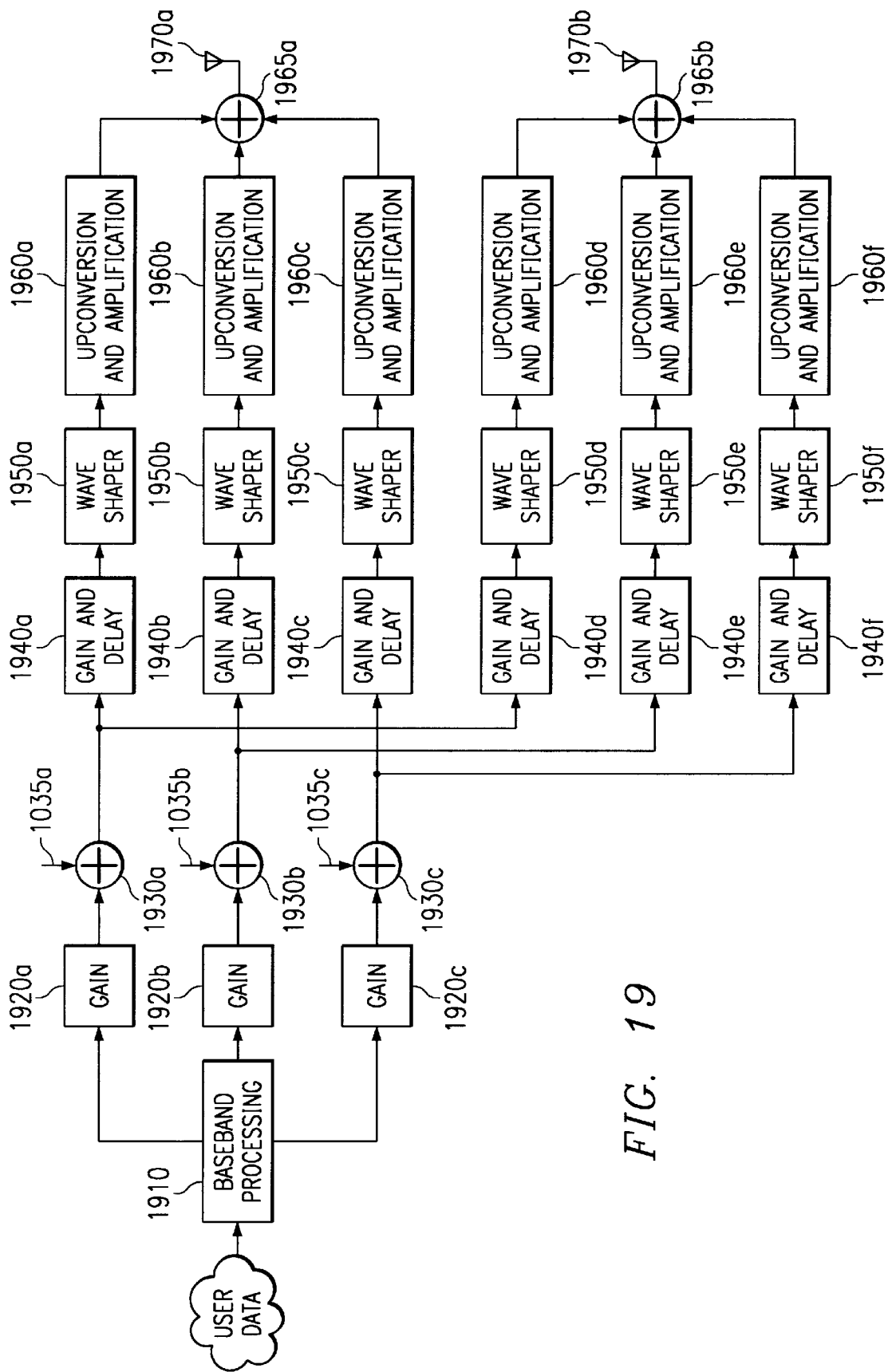
FIG. 19 is a functional block diagram which illustrates a multi-carrier system with a hybrid antenna configuration.

FIG. 19 is a functional block diagram which illustrates a multi-carrier system with a hybrid antenna configuration. Referring now to FIG. 19, user data is input to baseband processing circuitry 1910. The outputs of baseband processing circuitry 1910 are connected to gain circuits 1920a, 1920b and 1920c. The outputs of gain circuits 1920a, 1920b and 1920c are connected to circuits 1930a, 1930b and 1930c. Circuits 1930a, 1930b and 1930c also include inputs 1935a, 1935b and 1935c to receive additional user information from external sources. The outputs of circuits 1930a, 1930b and 1930c are connected to gain and delay circuits 1940a, 1940b and 1940c, respectively and to 1940d, 1940e and 1940f, respectively. The outputs of gain and delay circuits 1940a, 1940b, 1940c, 1940d, 1940e and 1940f are connected to wave shaper circuits 1950a, 1950b, 1950c, 1950d, 1950e and 1950f, respectively. The outputs of wave shaper circuits 1950a, 1950b, 1950c, 1950d, 1950e and 1950f are connected to upconverter and amplification circuits 1960a, 1960b, 1960c, 1960d, 1960e and 1960f, respectively. The outputs of upconverter and amplification circuits 1960a, 1960b and 1960c are then produced to circuit 1965a for combination and transmission from antenna 1970a. The outputs of upconverter and amplification circuits 1960d, 1960e and 1960f are then produced to circuit 1965b where they are summed and then transmitted from antenna 1970b. In operation, user data is input to baseband processor 1910. Thereafter, the user data is baseband processed and de-multiplexed into three channels as before with one exception. The baseband processing does not include spreading (coding) with P-N sequences. In the system of FIG. 19, the P-N sequences are added by the wave shaper circuitry 1950a–1950f prior to the actual wave form shaping. The three channels are eventually up-converted to three different carriers. In the embodiment of FIG. 19, however, each carrier is transmitted on multiple antennas. More specifically, the output carriers from baseband processor 1910 is transmitted to gain amplifiers 1920a, 1920b and 1920c. The amplified signals produced by gain amplifiers 1920a, 1920b and 1920c are then produced to summing circuitry 1930a, 1930b and 1930c, respectively. Summing circuitry 1930a, 1930b and 1930c is for adding in other users or user information when necessary. The other user information is received at inputs 1935a, 1935b and 1935c, respectively. Thereafter, the outputs of the summing circuitry 1930*a*, 1930*b* and 1930*c* are transmitted to gain and delay circuits 1940*a*, 1940*b* and 1940*c* respectively. Additionally, the outputs of the summing circuitry 1930*a*, 1930*b* and 1930*c* are transmitted to gain and delay circuits 1940*d*, 1940*e* and 1940*f* respectively. An advantage of this configuration is that each carrier is repeated and transmitted by multiple antennas as before to create better multi-path diversity than the other configurations. And, as before, different antennas are being used to create spatial diversity and/or polarization diversity.

The function of the gain and delay circuits 1940*a*–1940*f* is to introduce amplification of the signals and necessary amounts of delays as is known to those skilled in the art. The introduction of delay helps create multi-path diversity. The processing which occurs for the signals that are output by the gain and delay circuits 1940 is as before. Namely, the signals are transmitted to the wave shaper circuits 1950*a*–1950*f*, and then to up-converter and amplification circuits 1960*a*–1960*f*, respectively. As indicated before, however, the antenna configuration is changed in the embodiment of FIG. 19. More specifically, the outputs of up-converter and amplification circuits 1960*a*–1960*c* are summed by summing circuitry 1965*a* and then produced to and transmitted by antenna 1970*a*. The outputs of up-converter and amplification circuits 1960*d*–1960*f*, however, are summed by summing circuitry 1965*b* and then produced to and transmitted by antenna 1970*b*.

While each of the three channels produced by the gain and delay circuitry 1920*a*–1920*c* is transmitted by both antennas 1970*a* and 1970*f*, they are not necessarily transmitted at or near the same time. For instance, an algorithmic solution may specify that the delay of the gain and delay circuits 1940*d*, 1940*e* and 1940*f* is a value different than delay of the gain and delay circuits 1940*a*, 1940*b* and 1940*c*. Moreover, the gain may be set to different values. For example, if the gain of the gain and delay circuits 1940*d*–1940*f* is set to zero, then the three channels are transmitted only from antenna 1970*a*. The system of FIG. 19 may, by setting the gain to zero for selected gain and delay circuits 1940*a*–1940*f*, create a system which is the equivalent of the systems of FIGS. 11, 12, 13, 14 and 15.

Additionally, the configuration shown herein FIG. 19 can be changed to support down link beam forming with the addition of a pilot channel per user and as specified by control algorithms which control the gain and delay which is introduced on a per antenna basis. Beam forming is the transmission of a signal in a specific direction towards the mobile unit. To provide this capability, the summing circuits 1930*a*, 1930*b* and 1930*c* are sequentially arranged after the gain and delay circuits 1940*a*–1940*f*. Accordingly, three additional summing circuits must be added and placed after gain and delay circuits 1940*d*–1940*f*. As may be seen, therefore, the embodiment of FIG. 19 may readily be configured according to specific design requirements. For example, the system of FIG. 19 includes transmission of the plurality of channels by only two antennas. The system of FIG. 19 may be altered to include an antenna for each channel. Alternatively, it may be altered to include any number of antennas more than two. Because each carrier is transmitted on each antenna in the system of FIG. 19, there is no mapping of carriers to the number of antennas. For example, the system of FIG. 19 may be modified to include more antennas than carriers, if a system designer decides this is necessary to overcome interference or fading. The combining could be performed at baseband, Intermediate Frequency (IF) or Radio Frequency (RF). In the system of FIG. 19, however, the combining occurs at RF.

Figure 20:
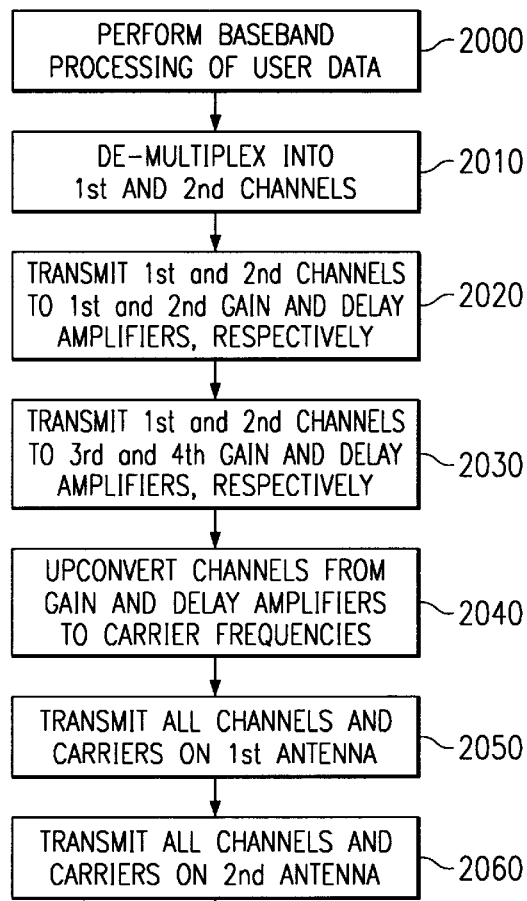
FIG. 20 is a logic flow diagram which illustrates a method for transmitting multiple carriers in a CDMA system over multiple antennas.

FIG. 20 is a logic flow diagram which illustrates a method for transmitting multiple carriers in a CDMA system over multiple antennas. Referring now to FIG. 20, the user data is received and processed by baseband processing circuitry (step 2000). The baseband circuitry then de-multiplexes the processed user data into a plurality of channels. For exemplary purposes, FIG. 20 illustrates that the user data is de-multiplexed into a first and second channel (step 2010). The first and second channels of data are then transmitted to a first gain and delay circuit and to a second gain and delay circuit, respectively (step 2020). The first and second channels of data are also transmitted to a third gain and delay circuit and to a fourth gain and delay circuit, respectively (step 2030). The outputs of the first and second gain and delay circuits are then produced to wave shaping and up-conversion circuits to up-convert the channels to a first and second carrier frequency (step 2040). The outputs of the third and fourth gain and delay circuits are produced to wave shaping and up-conversion circuits to up-convert the channels to the same first and second carrier frequencies (step 2040). Thereafter, the first and second channels on the first and second carrier as produced by the first and second wave shaping and up-conversion circuits are transmitted from the first antenna (step 2050). The first and second channels on the first and second carriers as produced by the third and fourth wave shaping and up-conversion circuits are transmitted from the second antenna (step 2060). As may be seen therefore, the method of FIG. 20 allows great flexibility in terms of the timing and gain of the transmission of a plurality of channels from a plurality of antennas to overcome the effects of fading or interference. It is to be understood that the method of FIG. 20 is not limited to only two carriers or to two antennas. Rather, the method can be modified to include any number of carriers or antennas. Moreover, the number of antennas is not limited by the number of carriers. Accordingly, it is possible to use more antennas than carriers, if necessary.

Figure 21:
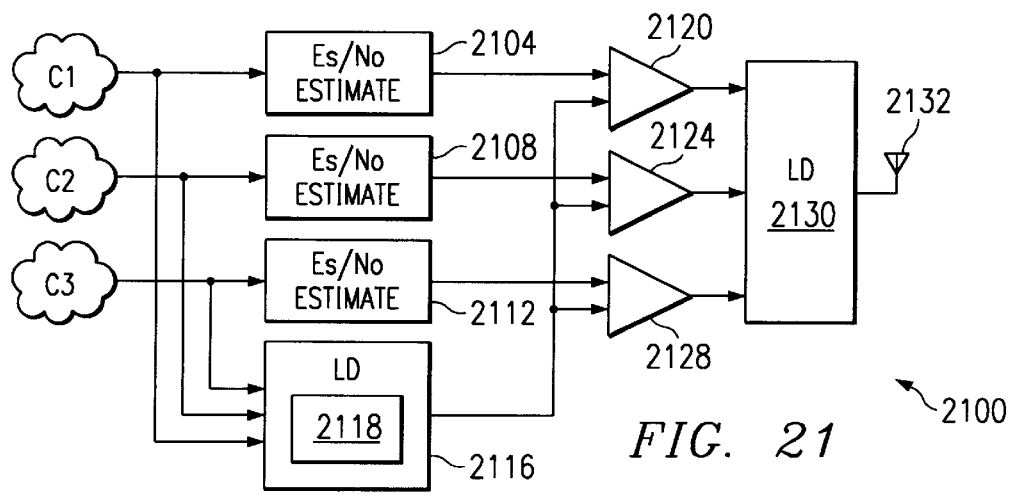
FIG. 21 is a functional block diagram of power control circuitry found within a transceiving unit.

FIG. 21 is a functional block diagram of power control circuitry found within a transceiving unit according to a first preferred embodiment of the invention. Referring now to FIG. 21, circuitry 2100 includes logic circuitry 2104, 2108 and 2112 which receive a plurality of data streams carried over a plurality of carriers C1, C2 and C3, the logic circuitry producing an estimate value of $E_s/N_o$ for each carrier. The data streams received over the plurality of carriers are understood to have been received by at least one antenna, down converted, and to have been base band processed prior to being received by the logic circuitry 2104, 2108 and 2112. More specifically, circuitry 2104 is coupled to receive a data stream from a first carrier. Similarly, circuitry 2108 is coupled to receive a data stream from a second carrier and circuitry 2112 is coupled to receive a data stream from a third carrier. Each of the circuits 2104, 2108 and 2112 produces an estimated for its respective carrier data stream. Comparator 2120 is connected to receive the $E_s/N_o$ estimate from circuits 2104. Comparator 2124 is connected to receive the $E_s/N_o$ estimate from circuitry 2108. Comparator 2128 is connected to receive the $E_s/N_o$ estimate produced by circuit 2112.

Continuing to refer to FIG. 21, circuitry 2100 further includes a logic device 2116 for producing an $E_s/N_o$ set point to each of the comparators 2120, 2124 and 2128. More specifically, logic device 2116 is coupled to receive the first, second and third carriers. Logic device 2116 is also connected to produce to comparators 2120, 2124 and 2128, an $E_s/N_o$ set point which is to be used for comparison purposes against the $E_s/N_o$ estimate produced by circuits 2104, 2108 and 2112, respectively. The outputs of comparators 2120, 2124 and 2128 are all connected to logic device 2130 which is for transmitting signals reflecting power control commands for each carrier. As may be seen, the output of logic device 2130 is connected to antenna 2132. Antenna 2132 is for transmitting the power control signals which are generated by logic device 2130 to a specified base station.

In operation, $E_s/N_o$ estimator circuits 2104, 2108 and 2112 each receive a data stream for a select carrier and calculate an estimated $E_s/N_o$ value therefor. Logic device 2116 also receives each of the data streams for the plurality of carriers. Logic device 2116, however, initially calculates a signal quality indicator metric such as a frame error rate (FER) and compares the calculated frame error rate to a frame error rate set point value which is stored within store 2118 of logic device 2116. Other signal quality indicator metrics such as symbol error rate may be used. Referring again to FIG. 21, and as a result of comparing the calculated frame error rate to the frame error rate set point found in store 2118, logic device 2116 calculates an $E_s/N_o$ set point which it then transmits to each of comparators 2120, 2124 and 2128. The comparators 2120, 2124 and 2128, in turn, compare the $E_s/N_o$ set point received from logic device 2116 to the estimated $E_s/N_o$ values received from circuits 2104, 2108 and 2112, respectively. The outputs of comparators 2120, 2124 and 2128, which include the results of the comparisons made therein, respectively, are produced to logic device 2130 which determines whether the transmission power of a specified carrier should be reduced, increased or left the same for the plurality of carriers received by $E_s/N_o$ estimator circuits 2104, 2108 and 2112. For this embodiment, logic device 2130 transmits a plurality of power control signals through antenna 2132. There is one power control signal for each carrier received. This allows a communicating base station to selectively control the power transmission level for each carrier independently. It is understood that FIG. 21 demonstrates a system which includes three carriers but that the implementation of a system similar to that of FIG. 21 may be modified to operate with a different number of carriers.

Figure 22:
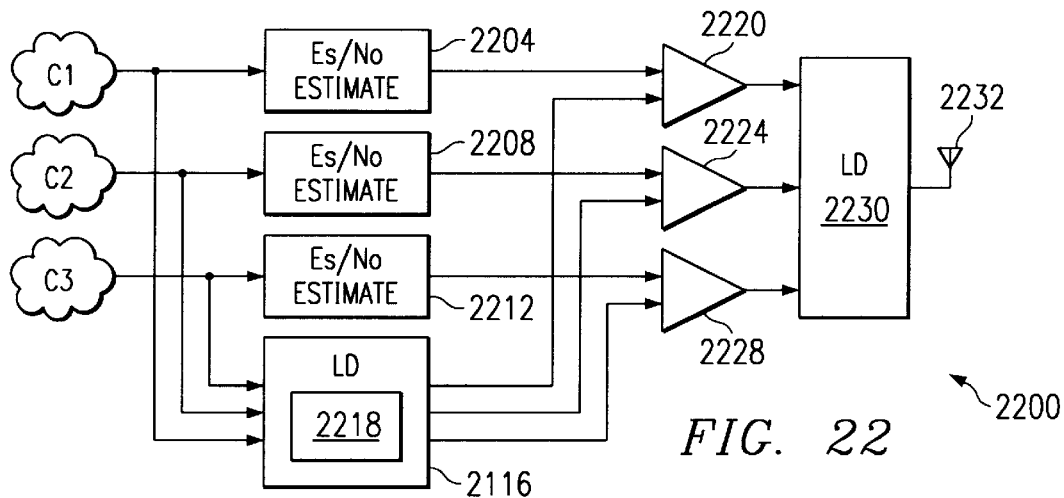
FIG. 22 is a functional block diagram of power control circuitry.

FIG. 22 is a functional block diagram of power control circuitry. Referring now to FIG. 22, $E_s/N_o$ estimator circuits 2204, 2208 and 2212 are coupled to receive data streams carried by a first, a second and a third carrier, respectively. Logic device 2216, similar to logic device 2116 of FIG. 21, also is coupled to receive the data streams from the first, second and third carriers. Logic device 2216 includes a store 2218 for storing a target frame error rate value. Logic device 2218 produces at least three outputs which are connected to comparators 2220, 2224 and 2228, respectively. The outputs of $E_s/N_o$ estimators circuits 2204, 2208 and 2212 also are connected to comparator circuits 2220, 2224 and 2228 to produce calculated $E_s/N_o$ estimates thereto for the first, second and third carriers, respectively. The outputs of comparators circuits 2220, 2224 and 2228 are connected to logic device 2230 to receive the outputs therefrom in which determines, on a per carrier basis, whether the power transmission levels should be increased, decreased or left the same. Logic device 2230 is also connected to antenna 2232 for transmitting power control commands for each carrier to the remote base station which is transmitting the first, second and third carriers.

In operation, circuitry 2200 is similar to circuitry 2100 of FIG. 21 in that a plurality of power control commands are transmitted for the plurality of carriers received by the $E_s/N_o$ circuits 2204, 2208 and 2212. One difference functionally, between circuits 2100 and 2200, however, is that comparator circuits 2220, 2224 and 2228 each receive a distinct $E_s/N_o$ set point for comparison purposes. In circuit 2100, the comparator circuits each received the same $E_s/N_o$ set point from logic device 2116 for comparison purposes.

Figure 23:
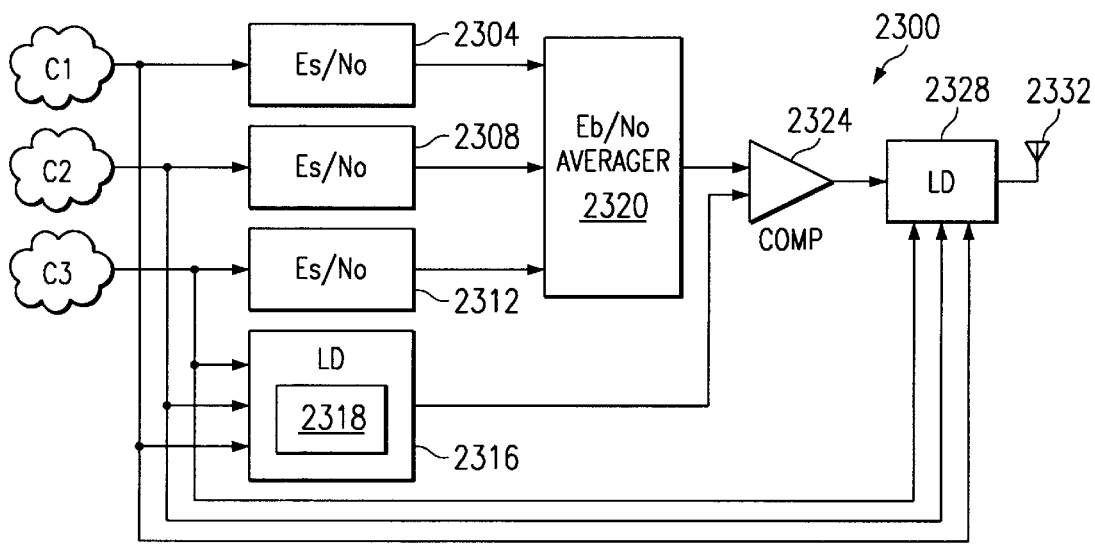
FIG. 23 is a functional block diagram of power control circuitry according to a preferred embodiment of the invention.

FIG. 23 is a functional block diagram of power control circuitry according to a third embodiment of the invention. Referring now to FIG. 23, $E_s/N_o$ circuits 2304, 2308 and 2312 are coupled to receive a plurality of data streams from a first, a second, and a third carrier, respectively. Logic device 2316 also is connected to receive the data streams from the first, the second and the third carriers and is for producing a target $E_s/N_o$ set point. Similarly, logic device 2328 is connected to receive the data streams from the first, the second and the third carriers. Logic device 2328 is for generating power control command signals for each of the carriers. Logic device 2328 is connected to receive the carriers so that it may calculate a "pilot strength signal" for each of the carriers as is known to those skilled in the art. Logic device 2328 uses the calculated pilot strengths in its logic for determining what power control command signals should be generated. By way of example, if a mobile transceiver determines that the pilot strength of one of the three carriers is below a specified threshold, the mobile transmitter may decide to send power down commands for that carrier. Alternatively, the mobile transmitter may generate power control commands for a specified carrier based upon relative pilot strengths of the different carriers.

The outputs of the three $E_s/N_o$ estimator circuits 2304, 2308 and 2312 are connected to logic device 2320 which operates as an $E_s/N_o$ averager 2320. The outputs of logic device 2316 and $E_s/N_o$ averager 2320 are connected to comparator 2324 which is for comparing the average $E_s/N_o$ to the $E_s/N_o$ set point. The output of comparator 2324 connected to logic device 2328 which determines whether power should be increased, decreased or remain the same for the three carriers, collectively. Logic device 2328 is connected to antenna 2332 through which it transmits power control command signals to a base station transmitting the data streams over the first, the second and third carriers received by $E_s/N_o$ circuits 2304, 2308 and 2312, respectively.

In operation, each of the $E_s/N_o$ circuits 2304, 2308 and 2312 produce an $E_s/N_o$ estimation value for the data stream received from a specified carrier. Accordingly, $E_s/N_o$ estimator circuit 2304 estimates an $E_s/N_o$ value for the data streams which was carried over the first carrier. Each of the $E_s/N_o$ estimates produced by the $E_s/N_o$ estimator circuits 2304, 2308 and 2312 are then averaged to create an average $E_s/N_o$ value by $E_s/N_o$ averager 2320. Logic device 2316, which receives each of the data streams from the first, the second and the third carriers determines the frame error rate for the three data streams. It then compares the calculated frame error rate to a target frame error rate which is stored in store 2318. From this comparison, logic device 2316 determines a target $E_s/N_o$ set point as is known by those skilled in the art. The determined target $E_s/N_o$ set point is then transmitted to comparator 2324 for comparison with the $E_s/N_o$ average produced by $E_s/N_o$ averager 2320. Logic device 2328 receives the results of the comparison by comparator 2324 and determines whether, collectively, the transmitting base station should increase its power, decrease its power or leave the transmission power level unchanged for the first, the second and the third carriers, collectively. For example, if the $E_s/N_o$ average is below a specified threshold, logic device 2328 may conclude that the transmission power for a base station should be increased. On the other hand, if the logic device also determines that the pilot signal strength is below a specified level, it may determine that the transmission power level should be dramatically reduced. Thus, if a carrier is in a fade and the logic device decides to reduce the transmission power level, overall system interference may be decreased.

For each embodiment using a plurality of antennas, the antennas may be co-located or they may be located at different sites. For example, the antennas may be placed at different cell sites according to design considerations to combat shadowing, structural interference, etc.

Figure 24:
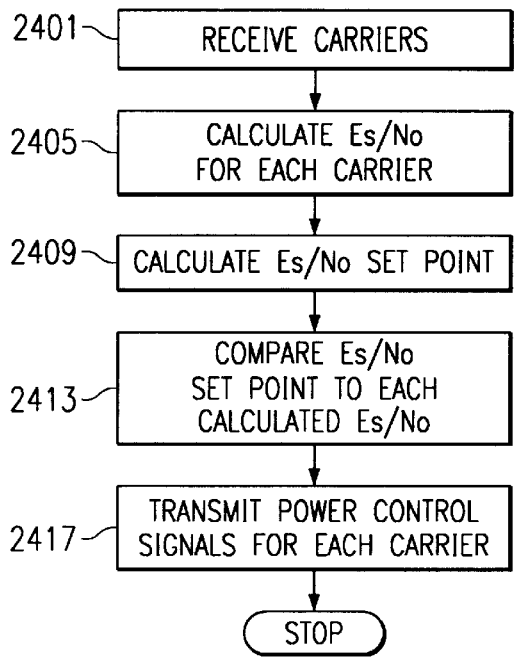
FIG. 24 is a logic flow diagram which illustrates a method for controlling transmission power levels in a multi-carrier network.

FIG. 24 is a logic flow diagram which illustrates a method for controlling transmission power levels in a multi-carrier network. Referring now to FIG. 24, a power control circuit received a plurality of data streams carried on a plurality of carriers (step 2401). Thereafter, an $E_s/N_o$ value is computed for each of the received carriers. Additionally, based upon the frame error rate, an $E_s/N_o$ set point is calculated (step 2409). The calculated $E_s/N_o$ set point is then compared to each of the calculated $E_s/N_o$ values (step 2413). Thereafter the power control signal is transmitted for each of the three carriers to a communicating base station (step 2417).

Figure 25:
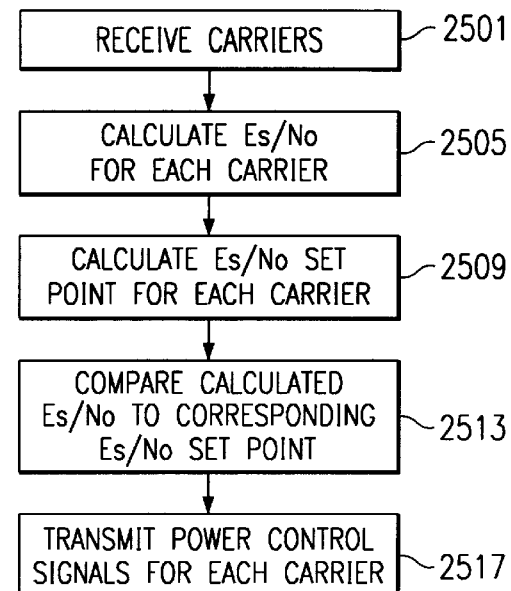
FIG. 25 is logic flow diagram which illustrates a method for controlling transmission power levels in a multi-carrier network.

FIG. 25 is a logic flow diagram which illustrates a method for controlling transmission power levels in a multi-carrier network. Referring now to FIG. 25, a plurality of data streams is received from a plurality of carriers (step 2501). Thereafter, an $E_s/N_o$ value is calculated for each of the carriers (step 2505). Additionally, an $E_s/N_o$ set point is calculated for each of the carriers according to the frame error (step 2509). Thereafter, each of the calculated $E_s/N_o$ values is compared to the corresponding calculated $E_s/N_o$ set point (step 2513). Finally, a power control signal is transmitted to a communicating base station for each of the data streams being received on each of the carriers (step 2517).

Figure 26:
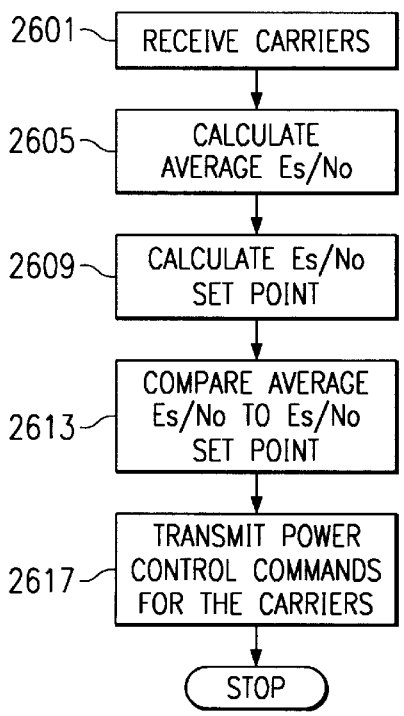
FIG. 26 is logic flow diagram which illustrates a method for power control according to a preferred embodiment of the inventive method.

FIG. 26 is logic flow diagram which illustrates a method for power control according to a preferred embodiment of the inventive method. Referring now to FIG. 26, a plurality of data streams are received from a plurality of carriers (step 2601). Thereafter, an average $E_s/N_o$ is calculated for the received data streams (step 2605). For this embodiment, an individual $E_s/N_o$ value is calculated for each data stream and then the individual $E_s/N_o$ values are averaged. Thereafter, one $E_s/N_o$ set point is calculated based on the frame error rate of the data streams received over the separate carriers (step 2609). The calculated average $E_s/N_o$ is then compared to the $E_s/N_o$ set point (step 2613). Finally, one power control command is transmitted for modifying or leaving the transmission power level the same for all carriers, collectively (step 2617). This signal is transmitted to a communication base station.

Figure 27:
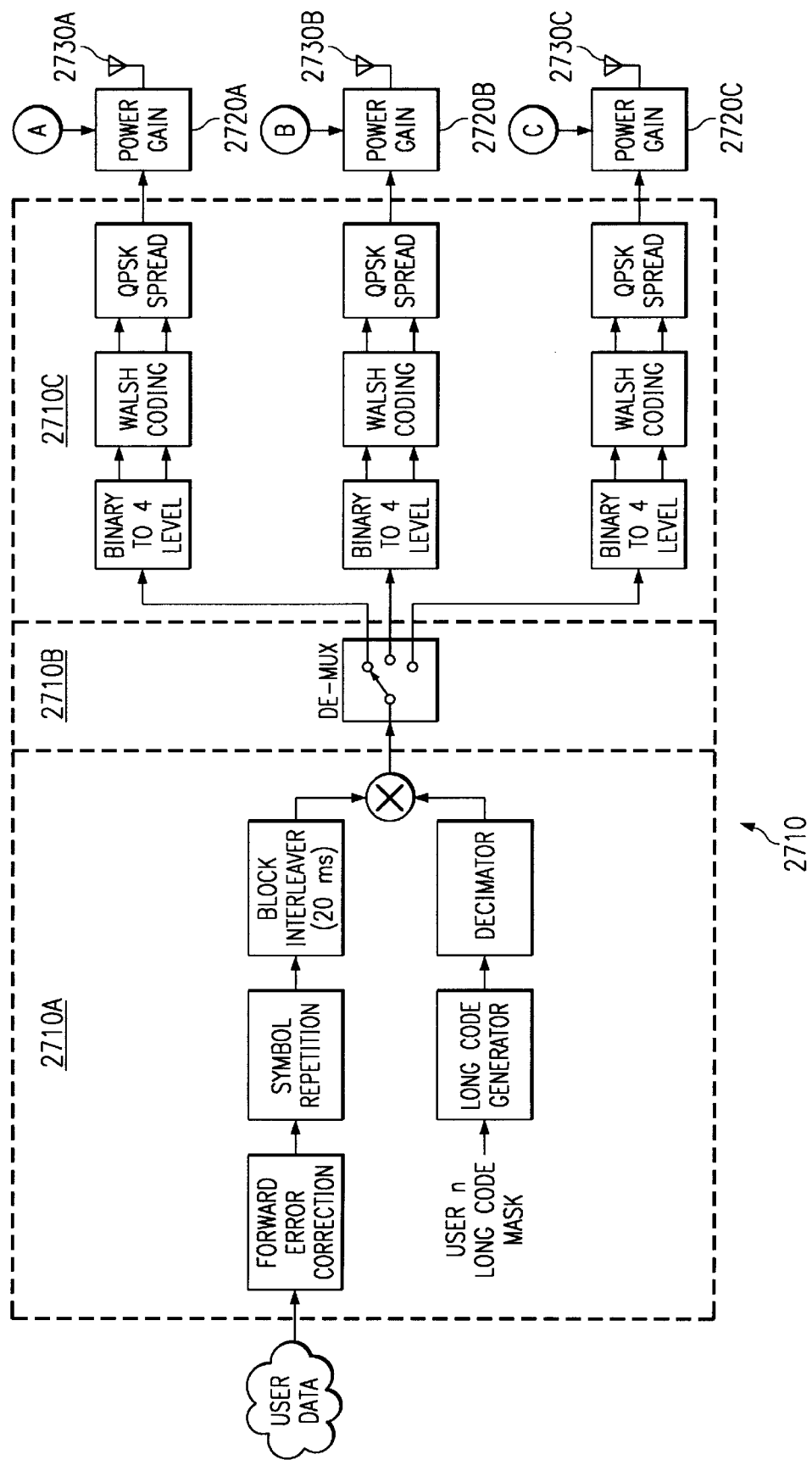
FIG. 27 is a functional block diagram of a forward link transmitter in a multi-carrier CDMA network.

FIG. 27 is a functional block diagram of a forward link transmitter in a multi-carrier CDMA network. Referring now to FIG. 27, user data is received and processed by circuitry 2710. Circuitry 2710 comprises conventional circuitry for processing user data shown at 2710A, demultiplexer shown at 2710B, and circuitry 2710C which is for coding and modulating each of the channels of data produced by demultiplexer 2710B. The operation of these systems are as discussed before and are generally known to those skilled in the art. Each of the channels produced by circuitry 2710C are input into power gain circuits 2720A, 2720B and 2720C, respectively. Power gain circuits 2720A, 2720B and 2720C also have inputs shown as A, B and C for receiving power control commands. The output of power gain circuits 2720A, 2720B and 2720C are connected to antennas 2730A, 2730B and 2730C for transmission therefrom. It is understood that antennas 2730A, 2730B and 2730C may be replaced by a single antenna 2730 or other antenna arrangements. In operation, circuitry 2710 processes the user data to produce a plurality of channels of data which are further processed for power adjustment and transmission by power gain circuits 2720A, 2720B and 2720C. Each of the power gain circuits 2720A, 2720B and 2720C, increase and decrease transmission power levels according to power control commands received at inputs A, B, and C, respectively.

Figure 28:
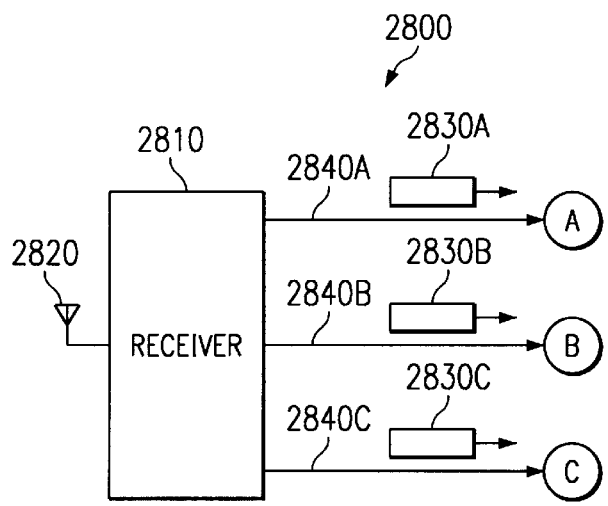
FIG. 28 is a functional block diagram which illustrates circuitry for generating power control commands for a plurality of carrier frequencies in a forward link multi-carrier CDMA transmitter.

FIG. 28 is a functional block diagram which illustrates circuitry for generating power control commands for a plurality of power gain circuits in a forward link multi-carrier CDMA transmitter. Power control commands are generated by the system shown generally at 2800. More specifically, receiver 2810 is connected to antenna 2820 to receive power control signals transmitted by a mobile transceiver (not shown). Receiver 2810 transmits power control commands 2830A, 2830B and 2830C over lines 2840A, 2840B and 2840C, respectively, to inputs A, B and C as shown in FIG. 27.

In operation, receiver 2810 receives the power control signals from antenna 2820 and generates corresponding power control commands 2830A, 2830B and 2830C. The power control commands prompt power gain circuits 2720A, 2720B and 2720C of FIG. 27 to increase or decrease transmission power levels. In general, the power control signals received from a mobile transceiver through antenna 2820 are received in the form of power control command bits in one of a plurality of different protocols as is known by those skilled in the art. Accordingly, if the mobile transceiver generates power control signals to reduce the transmission power level of one of the three carriers, receiver 2820 will receive that signal and send signals to power gain circuits 2720A, 2720B and 2720C which are responsive thereto. By way of example, receiver 2810A may transmit power control commands 2830A and 2830B which prompt power gain circuits 2720A and 2720B to increase transmission power levels and a power control command 2830C to power gain circuit 2720C which causes it to significantly reduce the transmission power level.

Though the invention has been described with respect to specific preferred embodiments, many variations and modifications will become apparent to those skilled in the art upon reading the present application. Additionally, the multiple methods and devices disclosed herein may readily be combined to form variations which are considered to be part of the invention herein regardless of whether the combinations are a point of the described embodiments or form new embodiments of the invention. For example, and as shown herein, the teachings with respect to power control may be applied to a single carrier network, to a multiple carrier network utilizing a single antenna, and to a multi-carrier network utilizing a plurality of antennas. It is therefore the intention that the appended claims be interpreted as broadly as possible in view of the prior art to include all such variations and modifications.

We claim:

1. A method for controlling the transmission power of a base station by a radiotelephone, the method comprising the steps of:

estimating a symbol-energy-to-noise-density value for each of a plurality of signals received over a plurality of carriers from the base station;

averaging the plurality of estimated symbol-energy-to-noise-density values;

comparing the average symbol-energy-to-noise-density value to a target value; and transmitting a power control command over a reverse power control signaling channel to the base station, the power control command instructing the base station to adjust its transmit power in response to the comparison.

2. The method of claim 1 further including the step of adjusting the target value after a predetermined period based upon signal quality indicators.

3. The method of claim 2 wherein the power control command instructs the base station to increase power if the average symbol-energy-to-noise-density value is less than the target value.

4. The method of claim 3 wherein the power control command instructs the base station to decrease power if the average symbol-energy-to-noise-density value is greater than the target value.

5. The method of claim 1 wherein the steps of estimating, averaging and comparing estimated symbol-energy-to-noise-density values include estimating, averaging and comparing bit-energy-to-noise-density values.

6. The method of claim 1 wherein the step of estimating the symbol-energy-to-noise-density values includes estimating the symbol-energy-to-noise-density values over a specified period.

7. The method of claim 6 wherein the specified period is a power control group duration.

8. A method for controlling the transmission power of a base station by a radiotelephone, the method comprising the steps of:

estimating a symbol-energy-to-noise-density value for each of a plurality of signals received over a plurality of carriers from the base station;

calculating a target symbol-energy-to-noise-density value for each of the plurality of signals received over the plurality of carriers from the base station;

comparing each of the calculated symbol-energy-to-noise-density values to each of the corresponding target symbol-energy-to-noise-density values; and transmitting a plurality of power control commands for each of plurality of carriers over a reverse power control signaling channel to the base station, the power control commands instructing the base station to adjust its transmit power in response to the comparison.

9. The method of claim 8 further including the step of adjusting each of the target symbol-energy-to-noise-density values after a specified period based upon signal quality indicators for each of the carriers.

10. The method of claim 9 wherein the power control command instructs the base station to increase power if the symbol-energy-to-noise-density value is less than the target symbol-energy-to-noise-density value on a per carrier basis.

11. The method of claim 10 wherein the power control command instructs the base station to decrease power if the symbol-energy-to-noise-density value is greater than the target symbol-energy-to-noise-density value on a per carrier basis.

12. The method of claim 11 wherein the power control command instructs the base station to decrease power if the pilot strength is less than a specified threshold.

13. The method of claim 12 wherein the step of estimating the symbol-energy-to-noise-density values includes estimating the symbol-energy-to-noise-density values over a specified period.

14. The method of claim 13 wherein the specified period is a power control group duration.

15. A method for controlling the transmission power of a base station by a radiotelephone, the method comprising the steps of:

estimating a symbol-energy-to-noise-density value for each of a plurality of signals received over a plurality of carriers from the base station;

calculating a target symbol-energy-to-noise-density value;

comparing each of the calculated symbol-energy-to-noise-density values to the target symbol-energy-to-noise-density value; and transmitting a plurality of power control commands for each of plurality of carriers over a reverse power control signaling channel to the base station, the power control commands instructing the base station to adjust its transmit power in response to the comparison.

16. The method of claim 15 further including the step of adjusting the target symbol-energy-to-noise-density value after a specified period based upon signal quality of at least one carrier.

17. The method of claim 16 wherein the power control command instructs the base station to increase power if the symbol-energy-to-noise-density value is less than the target symbol-energy-to-noise-density value on a per carrier basis.

18. The method of claim 17 wherein the power control command instructs the base station to decrease power if the symbol-energy-to-noise-density value is greater than the target symbol-energy-to-noise-density value on a per carrier basis.

19. The method of claim 18 wherein the step of estimating the symbol-energy-to-noise-density values includes estimating the symbol-energy-to-noise-density values over a specified period.

20. The method of claim 19 wherein the specified period is a power control group duration.

* * * * *